(12) United States Patent
Kobayashi

(10) Patent No.: US 8,134,622 B2
(45) Date of Patent: Mar. 13, 2012

(54) IMAGING DEVICE

(75) Inventor: Takakazu Kobayashi, Sakura (JP)

(73) Assignee: Nikon Corporation, Tokyo (JP)

( * ) Notice: Subject to any disclaimer, the term of this patent is extended or adjusted under 35 U.S.C. 154(b) by 149 days.

(21) Appl. No.: 12/753,513

(22) Filed: Apr. 2, 2010

(65) Prior Publication Data
US 2010/0188539 A1    Jul. 29, 2010

Related U.S. Application Data

(63) Continuation of application No. PCT/JP2008/002661, filed on Sep. 25, 2008.

(30) Foreign Application Priority Data

Oct. 9, 2007    (JP) ................................. 2007-263576

(51) Int. Cl.
H04N 3/14    (2006.01)
(52) U.S. Cl. ...................................... 348/300
(58) Field of Classification Search .................. 348/302, 348/300
See application file for complete search history.

(56) References Cited

U.S. PATENT DOCUMENTS

| | | | |
|---|---|---|---|
| 4,942,474 A | 7/1990 | Akimoto et al. | |
| 5,471,515 A | 11/1995 | Fossum et al. | |
| 5,793,322 A | 8/1998 | Fossum et al. | |
| 5,841,126 A | 11/1998 | Fossum et al. | |
| 5,880,691 A | 3/1999 | Fossum et al. | |
| 5,886,659 A | 3/1999 | Pain et al. | |
| 5,887,049 A | 3/1999 | Fossum | |
| 5,909,026 A | 6/1999 | Zhou et al. | |
| 5,929,800 A | 7/1999 | Zhou et al. | |
| 5,949,483 A | 9/1999 | Fossum et al. | |
| 5,952,645 A | 9/1999 | Wang et al. | |
| 5,990,506 A | 11/1999 | Fossum et al. | |
| 6,021,172 A | 2/2000 | Fossum et al. | |
| 6,057,539 A | 5/2000 | Zhou et al. | |

(Continued)

FOREIGN PATENT DOCUMENTS

JP    A-1-154678    6/1989

(Continued)

OTHER PUBLICATIONS

International Search Report mailed on Jan. 6, 2009 in corresponding International Application No. PCT/JP2008/002661.

*Primary Examiner* — Jason Chan
*Assistant Examiner* — Gary C Vieaux
(74) *Attorney, Agent, or Firm* — Oliff & Berridge, PLC

(57) ABSTRACT

An imaging device has pixels being disposed two-dimensionally, in matrix, a plurality of vertical signal lines each coupled to a plurality of the pixels in a column direction, a column amplifier amplifying an optical signal and a reset signal, and a holding part holding each of the optical signal and the reset signal. The imaging device is provided with a first clip driving circuit which is disposed between the vertical signal lines and the column amplifier and clips a signal out of a predetermined voltage, a first clip voltage generation circuit which gives a clip voltage to the first clip driving circuit, a second clip driving circuit which is disposed between the column amplifier and the holding part and clips a signal out of a predetermined voltage, and a second clip voltage generation circuit which gives a clip voltage to the second clip driving circuit.

4 Claims, 16 Drawing Sheets

U.S. PATENT DOCUMENTS

| | | | |
|---|---|---|---|
| 6,101,232 A | 8/2000 | Fossum et al. |
| 6,107,618 A | 8/2000 | Fossum et al. |
| 6,107,619 A | 8/2000 | Cunningham et al. |
| 6,115,065 A | 9/2000 | Yadid-Pecht et al. |
| 6,124,819 A | 9/2000 | Zhou et al. |
| 6,166,768 A | 12/2000 | Fossum et al. |
| 6,175,383 B1 | 1/2001 | Yadid-Pecht et al. |
| 6,326,230 B1 | 12/2001 | Pain et al. |
| 6,346,700 B1 | 2/2002 | Cunningham et al. |
| 6,373,050 B1 | 4/2002 | Pain et al. |
| 6,380,572 B1 | 4/2002 | Pain et al. |
| 6,384,413 B1 | 5/2002 | Pain |
| 6,400,824 B1 | 6/2002 | Mansoorian et al. |
| 6,403,963 B1 | 6/2002 | Nikzad et al. |
| 6,456,326 B2 | 9/2002 | Fossum et al. |
| 6,476,860 B1 | 11/2002 | Yadid-Pecht et al. |
| 6,486,503 B1 | 11/2002 | Fossum |
| 6,515,702 B1 | 2/2003 | Yadid-Pecht et al. |
| 6,519,371 B1 | 2/2003 | Pain et al. |
| 6,546,148 B1 | 4/2003 | Yadid-Pecht et al. |
| 6,549,235 B1 | 4/2003 | Fossum et al. |
| 6,555,842 B1 | 4/2003 | Fossum et al. |
| 6,570,617 B2 | 5/2003 | Fossum et al. |
| 6,606,122 B1 | 8/2003 | Shaw et al. |
| 6,665,013 B1 | 12/2003 | Fossum et al. |
| 6,721,464 B2 | 4/2004 | Pain et al. |
| 6,744,068 B2 | 6/2004 | Fossum et al. |
| 6,787,749 B1 | 9/2004 | Zhou et al. |
| 6,801,258 B1 | 10/2004 | Pain et al. |
| 6,825,059 B2 | 11/2004 | Fossum |
| 6,838,301 B2 | 1/2005 | Zheng et al. |
| 6,839,452 B1 | 1/2005 | Yang et al. |
| 6,933,488 B2 | 8/2005 | Pain |
| 6,943,838 B2 | 9/2005 | Fossum et al. |
| 6,944,352 B1 | 9/2005 | Yadid-Pecht et al. |
| 6,950,132 B1 * | 9/2005 | Kozuka ........................ 348/243 |
| 6,980,230 B2 | 12/2005 | Yadid-Pecht et al. |
| 7,002,626 B2 | 2/2006 | Pain et al. |
| 7,019,345 B2 | 3/2006 | Pain et al. |
| 7,053,929 B2 | 5/2006 | Yadid-Pecht et al. |
| 7,105,371 B2 | 9/2006 | Fossum et al. |
| 7,141,775 B2 | 11/2006 | Koseki |
| 7,190,398 B1 | 3/2007 | Yadid-Pecht et al. |
| 7,268,814 B1 | 9/2007 | Pain et al. |
| 7,369,166 B2 | 5/2008 | Fossum et al. |
| 7,394,491 B2 | 7/2008 | Bae et al. |
| 7,528,871 B2 * | 5/2009 | Masuyama et al. ........... 348/294 |
| 7,817,199 B2 * | 10/2010 | Yamashita et al. ........... 348/308 |
| 8,045,032 B2 * | 10/2011 | Muroshima et al. .......... 348/308 |
| 2005/0253946 A1 * | 11/2005 | Shinohara ..................... 348/300 |
| 2006/0176519 A1 | 8/2006 | Ouchi |
| 2009/0033782 A1 * | 2/2009 | Muroshima et al. .......... 348/308 |
| 2010/0328509 A1 * | 12/2010 | Yamashita et al. ........... 348/300 |

FOREIGN PATENT DOCUMENTS

| | | |
|---|---|---|
| JP | A-2004-222273 | 8/2004 |
| JP | A-2005-252529 | 9/2005 |
| JP | A-2006-222708 | 8/2006 |
| JP | A-2006-238283 | 9/2006 |
| JP | A-2008-42675 | 2/2008 |

* cited by examiner

IMAGING DEVICE

CROSS REFERENCE TO RELATED APPLICATION

This application is a continuation application of International Application PCT/JP2008/002661, filed Sep. 25, 2008, designating the U.S., and claims the benefit of priority from Japanese Patent Application No. 2007-263576, filed on Oct. 9, 2007, the entire contents of which are incorporated herein by reference.

BACKGROUND

1. Field

The present application relates to an imaging device.

2. Description of the Related Art

In late years, video cameras and electronic cameras using a CMOS type imaging device become widely used. The CMOS type imaging device includes a plurality of pixels disposed in a two-dimensional array and having a photoelectric conversion part which converts a received light into an electric signal, and is made up of vertical signal lines for reading an electric signal output by each pixel, a vertical scanning circuit and a horizontal output circuit.

The CMOS type imaging device has an FD (floating diffusion) part to which a charge accumulated in the photoelectric conversion part is transferred and accumulated, and the charge transferred to the FD part is selected by a switch specifying an address of each pixel and is read to a vertical signal line on which a source-follower circuit is formed by a constant current generator. Signals read to the vertical signal lines simultaneously from pixels of one row are output from the imaging device by the horizontal output circuit.

In general, the CMOS type imaging device has larger noise as compared to a CCD type imaging device, and thus there have been made various proposals for reducing the noise.

For example, for removing noise occurring in each pixel, there is used a correlated double sampling circuit which reads an optical signal containing optical information and a reset signal containing a noise component from a pixel, and removing the noise component by subtracting the reset signal from the optical signal (see, for example, Japanese Unexamined Patent Application Publication No. H01-154678).

There is further considered a method to prevent signal saturation when high luminance is input by providing a clip circuit on an input side of a column amplifier, which forms a correlated double sampling circuit disposed on each vertical signal line (see, for example, Japanese Unexamined Patent Application Publication No. 2008-042675).

When a light with high luminance is input to the CMOS type imaging device, there may occur a problem that a signal charge of the photoelectric conversion part overflows into the FD part even when a charge transfer transistor of a photodiode PD is off. When the signal charge overflows into the FD part, it causes the level of the reset signal to fluctuate and become large, and thus the signal after subtracting the reset signal from the optical signal becomes small. For instance, as an extreme example, when the sun enters an imaging angle of view, a dark signal saturates and the difference from the optical signal becomes zero, which results in a problem that the portion of the sun in an output image becomes black.

Moreover, when the clip circuit is provided on the input side of the column amplifier, if an intense light at the level that does not cause the clip circuit to operate is incident before resetting the column amplifier, a signal overflowed into the FD part from the photodiode PD by the incident light appears on the output side of the column amplifier as a dark signal. As a result, the difference from the optical signal becomes small, which causes a problem that an output image of a pixel portion thereof turns to black or dark gray.

In general, the clip circuit which can be disposed in each column amplifier has a limitation on the accuracy of clip level. Thus, when the column amplifier is used with high gain, the above-described problems occur inevitably.

Particularly, an electronic camera taking a moving image or performing a live-view display not using a mechanical shutter, a light incident via an optical system cannot be blocked physically, and the photoelectric conversion part is constantly irradiated with a light. Thus, the problems as described above occur.

In view of the above-described problems, a proposal of the present application is to provide an imaging device which does not allow a high-luminance portion of an output image to be black when a high-luminance subject such as the sun is included in a moving image or a live-view display, and thus can achieve a high-quality live view and a moving image with high picture quality.

SUMMARY

An imaging device according to the present embodiment has pixels being disposed in two-dimensionally (matrix) and having a photoelectric conversion part converting a light into an electric signal, a plurality of vertical signal lines each coupled to a plurality of the pixels in a column direction and receiving an optical signal containing optical information and a reset signal containing a noise component from the pixels, a column amplifier which amplifies the optical signal and the reset signal read to each of the vertical signal lines, and a holding part which holds each of the optical signal and the reset signal amplified in the column amplifier. The imaging device has a first clip driving circuit which is disposed between each of the vertical signal lines and the column amplifier and clips a signal out of a predetermined voltage, a first clip voltage generation circuit which gives a clip voltage to the first clip driving circuit, a second clip driving circuit which is disposed between the column amplifier and the holding part and clips a signal out of a predetermined voltage, and a second clip voltage generation circuit which gives a clip voltage to the second clip driving circuit.

Particularly, the first clip voltage generation circuit has a dummy circuit which is of a same size and a same bias as the first clip driving circuit and generates a clip voltage cancelling a gate-source voltage of a MOS transistor for clipping which forms the first clip driving circuit, and the second clip voltage generation circuit has a dummy circuit which is of a same size and a same bias as the second clip driving circuit and generates a clip voltage cancelling a gate-source voltage of a MOS transistor for clipping which forms the second clip driving circuit.

Further, the first clip voltage generation circuit generates the clip voltage based on a level of the reset signal.

Moreover, the column amplifier is formed of a differential amplifier having a constant current generator, and couples a drain of the MOS transistor for clipping which forms the second clip driving circuit to the constant current generator of the differential amplifier of the column amplifier.

According to the present application, when a high luminance subject such as the sun is included in an moving image or a live-view display, a signal out of a predetermined voltage is clipped, and thus a high quality live view and a moving image with high picture quality in which inversion of gradations of an image does not occur in a high-luminance spot can be achieved. Further, a clip voltage is generated using a dummy circuit which cancels a gate-source voltage of a MOS transistor for clipping, and thus the influence of dispersion of a clip circuit can be reduced, and an adjustment operation can also be dispensed with. Furthermore, by making the current source of the clip circuit in common with that of the column amplifier, current consumption can be reduced and deterioration in the S/N ratio due to current fluctuation when a clip circuit operates can be prevented.

DETAILED DESCRIPTION OF THE EMBODIMENT

Figure 1:
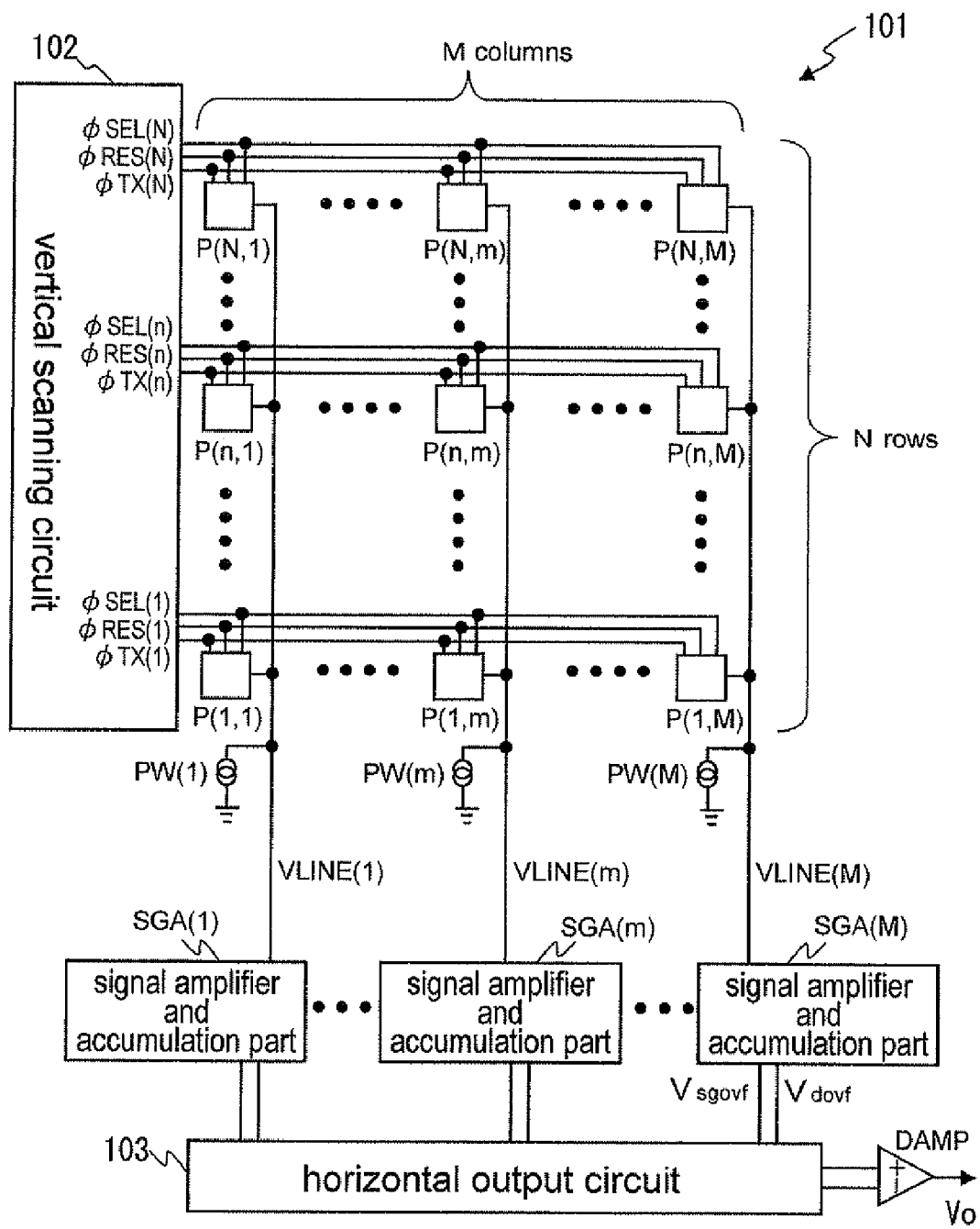
FIG. 1 is a block diagram of an imaging device 101 of an embodiment of the present invention.

FIG. 1 is a block diagram showing an overview of an imaging device 101 according to an embodiment of the present invention. The imaging device 101 includes pixels P(x,y), vertical signal lines VLINE(y), constant current generators PW(y), signal amplifier and accumulation parts SGA (y), a vertical scanning circuit 102, a horizontal output circuit 103, and a differential amplifier DAMP. Here, x denotes a natural number of 1 to N, and y denotes a natural number of 1 to M. An M×N number of pixels P(x,y) forms an imaging part of the imaging device 101, and is arranged in a matrix form of N rows and M columns.

Signals read from the pixels P(x,y) are read to the vertical signal lines VLINE(y) corresponding to respective columns. Further, on the vertical signal line VLINE(y) of each column, a constant current generator PW(y) forming a source follower circuit is disposed on each column.

The vertical scanning circuit 102 outputs various timing signals for reading signals of the pixels P(x,y) to the vertical signal lines VLINE(y) in units of rows. For example, in the n-th row, a timing signal φSEL(n), a timing signal φRES(n), and a timing signal φTX(n) are given to all the pixels of the entire M column from the pixel P(n,1) to the pixel P(n,M). Note that operations of each timing signal will be described in detail later.

A signal amplifier and accumulation part SGA(y) reads an optical signal containing a taken image and a reset signal containing a noise component before accumulating an optical signal from each pixel P(x,y), amplifies them, and thereafter accumulates the optical signal and the reset signal respectively in capacitors, Particularly, in this embodiment, clip circuits are provided in front and back of an amplifier (column amplifier) of the signal amplifier and accumulation part SGA (y). Note that the signal amplifier and accumulation part SGA(y) and the clip circuits will be described in detail later. Further, the column amplifier forms a correlated double sampling circuit and removes dispersions between pixels of this column.

The horizontal output circuit 103 reads the optical signal and the reset signal accumulated in the signal amplifier and accumulation parts SGA(y) and outputs the signals to the outside in units of rows. In this point, to reduce dispersion in the column amplifiers of the signal amplifier and accumulation parts SGA(y), the reset signal is subtracted from the optical signal in the differential amplifier DAMP when outputting from the imaging device 101, thereby outputting a signal Vo from which the dispersion among the column amplifiers provided in the respective columns is removed. Incidentally, the processing to subtract the reset signal from the optical signal may be performed in the imaging device 101, or the optical signal and the reset signal may be output separately from the imaging device 101 so as to subtract the reset signal from the optical signal externally.

Next, a circuit structure of the pixel P(n,M) of FIG. 1 will be described using FIG. 2. Note that each of the M×N number of pixels P(x,y) has the same circuit structure. Further, descriptions of FIG. 2 and so on are on structures coupled to the vertical signal line of the M-th column unless otherwise specified.

Figure 2:
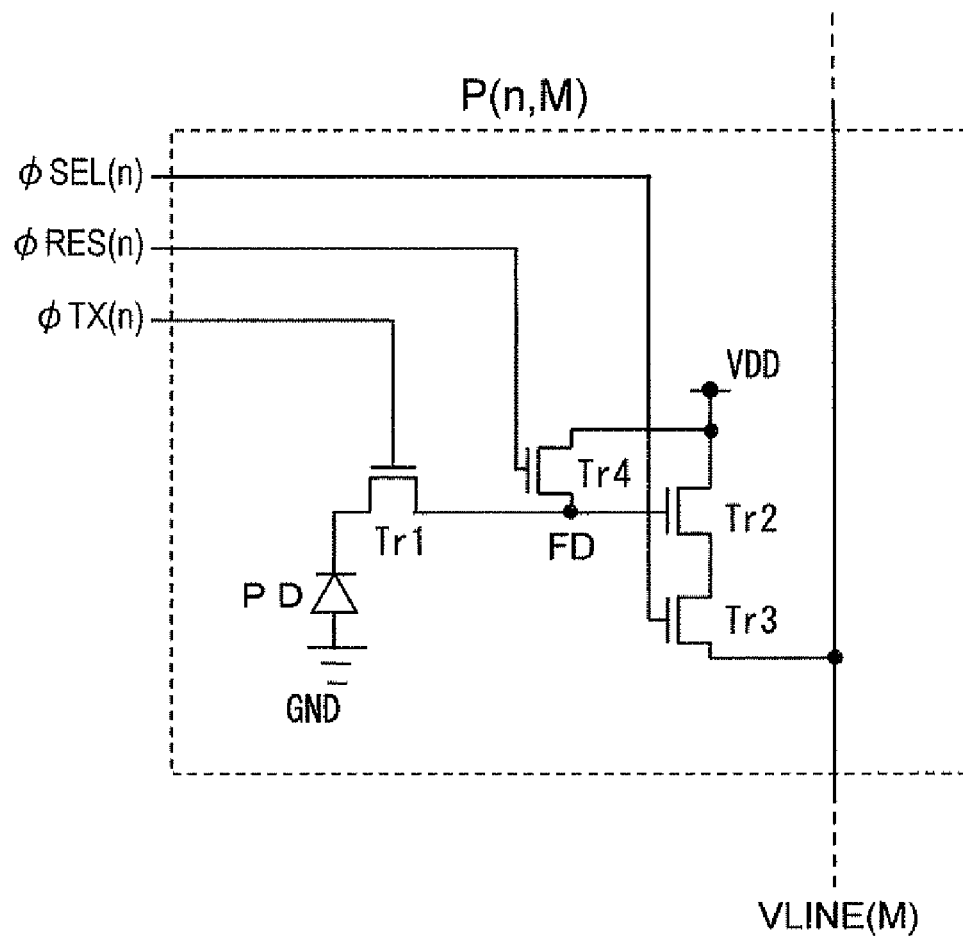
FIG. 2 is a circuit diagram of a pixel P(n,M).

In FIG. 2, the unit pixel P(n,M) includes a photodiode PD, a transfer transistor Tr1, an amplifying transistor Tr2, a selecting transistor Tr3, and a reset transistor Tr4. Incidentally, VDD denotes a power supply, GND denotes ground, and FD denotes a floating diffusion part (floating diffusion region). Further, the timing signal φSEL(n), the timing signal φRES (n), the timing signal φTX(n), and the vertical signal line VLINE(M) are the same as those in FIG. 1.

In FIG. 2, a light incident on the photodiode PD is photoelectrically converted and accumulated as a charge. When the timing signal φTX(n) is input to a gate of the transfer transistor Tr1, the charge accumulated in the photodiode PD is transferred to the FD part and is amplified by the amplifying transistor Tr2. The signal amplified by the amplifying transistor Tr2 is read to the vertical signal line VLINE(M) when the timing signal φSEL(n) is input to a gate of the selecting transistor Tr3. Incidentally, when the timing signal φRES(n) is input to a gate of the reset transistor Tr4, the FD part is reset to a reset voltage (VDD−Vt−ΔVt). Here, Vt denotes a threshold voltage, and ΔVt denotes an amount of variation due to a back-gate effect.

In this manner, the signal of the pixel P(n,M) is read to the respective corresponding vertical signal lines VLINE(1)-(M) and thereafter input to the signal amplifier and accumulation parts SGA(1)-(M) disposed on the respective columns.

Figure 3:
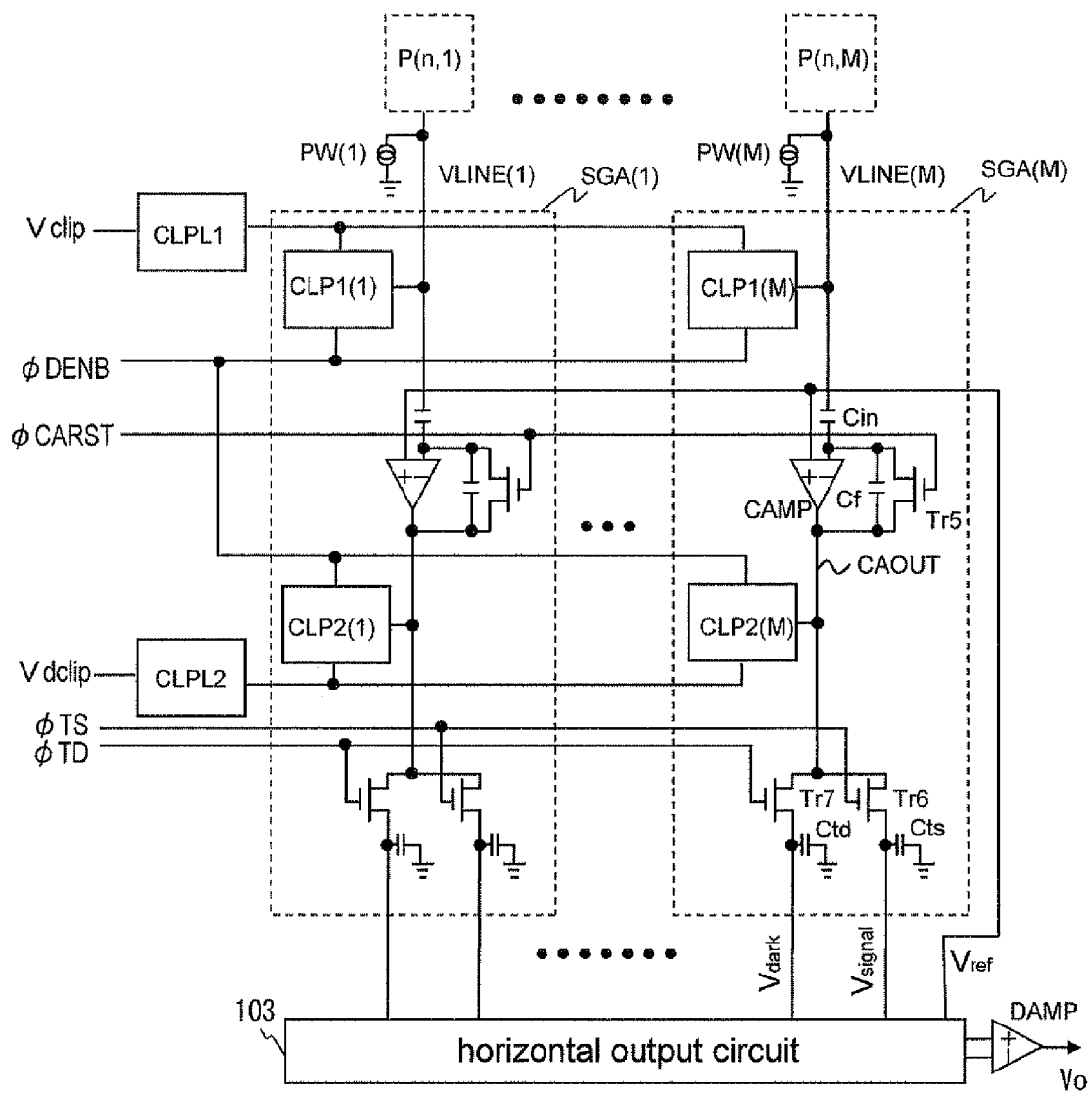
FIG. 3 is a block diagram of signal amplifier and accumulation parts SGA.

Next, structures of the signal amplifier and accumulation parts SGA(1)-(M) will be described using FIG. 3. FIG. 3 depicts a structure for reading signals from the pixels P(n,1) to P(n,M) of the n-th row to the vertical signal lines VLINE (1)-(M), amplifying them in the signal amplifier and accumulation parts SGA(1)-(M), and thereafter outputting an optical signal Vsignal and a reset signal Vdark accumulated in a capacitor Ctd and a capacitor Cts to the horizontal output circuit 103.

In FIG. 3, a structure of the signal amplifier and accumulation part SGA(M) of the M-th column will be described. Note that the signal amplifier and accumulation part SGA(1) of the first column in FIG. 3 has the same circuit structure, and the signal amplifier and accumulation parts SGA(y) of the other not-shown columns have the same circuit structure. In the signal amplifier and accumulation part SGA(M) of the M-th column, a signal read from the pixel P(n,M) to the vertical signal line VLINE(M) on which a source-follower circuit is formed by the constant current generator PW(M) is input to a capacitor Cin of the signal amplifier and accumulation part SGA(M). The capacitor Cin is coupled to a − input terminal of a column amplifier CAMP, and a reference voltage Vref is supplied to a + input terminal from the horizontal output circuit 103.

The column amplifier CAMP is an inverting amplifier with a gain determined by a ratio of a capacitor Cf to the capacitor Cin. Further, a source and a drain of an amplifier reset transistor Tr5 are coupled to both ends of the capacitor Cf of a feedback circuit of the column amplifier CAMP, and a charge accumulated in the capacitor Cf is discharged and reset by giving a timing signal φCARST to a gate of the transistor Tr5.

An output CAOUT of the column amplifier CAMP is coupled to drains of an optical signal accumulating transistor Tr6 and a reset signal accumulating transistor Tr7. When a timing signal φTS is input to a gate of the optical signal accumulating transistor Tr6, the optical signal accumulating transistor Tr6 turns on, and the capacitor Cts is charged until becoming an output voltage of the column amplifier CAMP. Further, when a timing signal φTD is input to a gate of the reset signal accumulating transistor Tr7, the reset signal accumulating transistor Tr7 turns on, and the capacitor Ctd is charged until becoming an output voltage of the column amplifier CAMP. A voltage of the capacitor Cts is input as the optical signal Vsignal and a voltage of the capacitor Ctd is input as the reset signal Vdark to the horizontal output circuit 103.

Thus, the M number of signal amplifier and accumulation parts SGA(1)-(M) output optical signals and reset signals of the pixels P(n,1) to P(n,M) of the n-th row to the horizontal output circuit 103 column by column.

In FIG. 3, characteristics of this embodiment are that a first clip circuit CLP1(M) is coupled to the vertical signal line VLINE(M) of the capacitor Cin on the input side of the column amplifier CAMP, and a second clip circuit CLP2(M) is coupled to the output CAOUT of the column amplifier CAMP. First, for easy understanding of the characteristics of this embodiment, operations when the first clip circuit CLP1(M) and the second clip circuit CLP2(M) are not provided will be described using a timing chart of FIG. 4.

Figure 4:
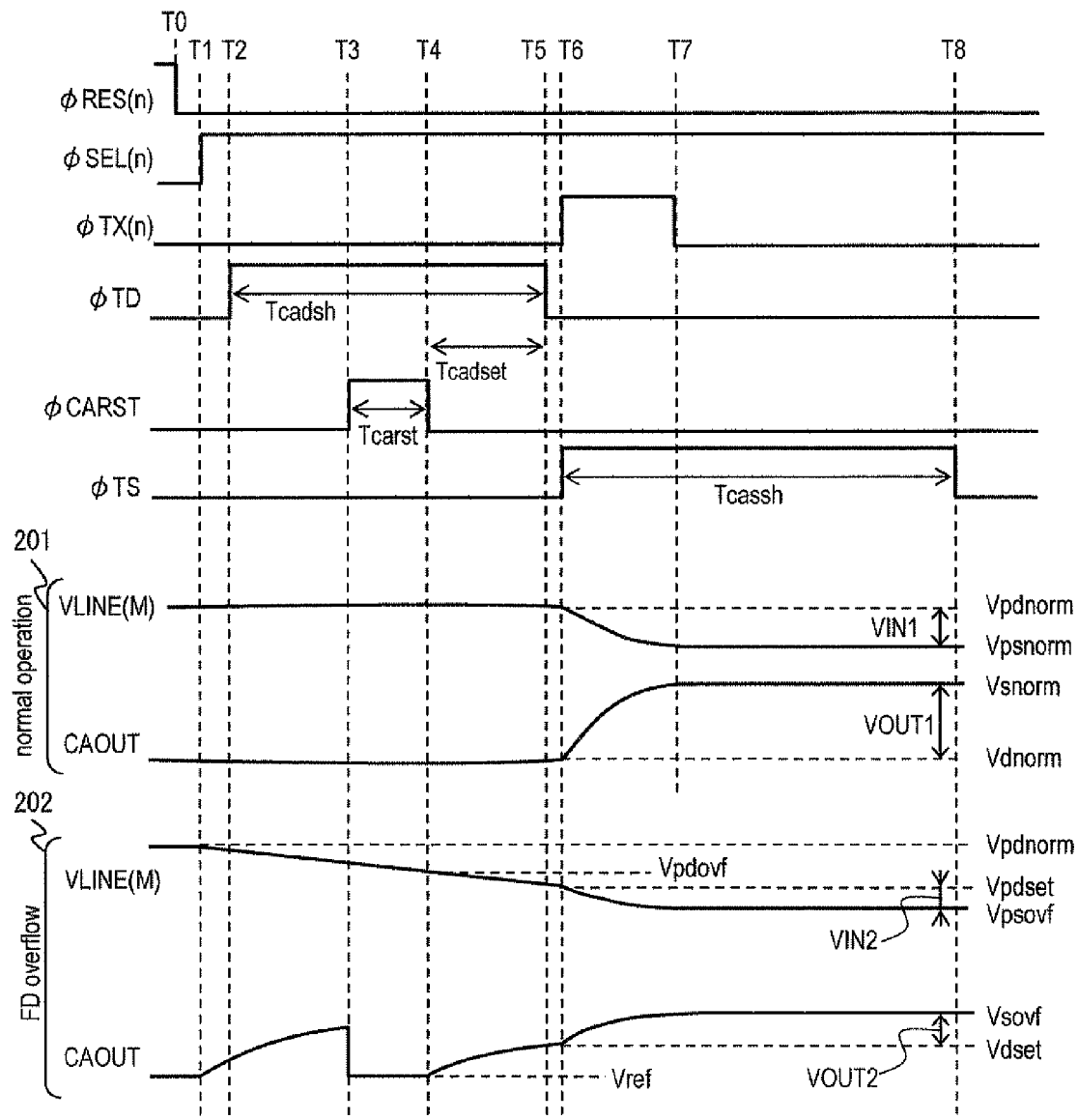
FIG. 4 shows a timing chart and output signal waveforms when clip circuits are not present.

FIG. 4 depicts the timing signals φRES(n), φTX(n), φSEL(n) of the n-th row described with FIG. 2 and the timing signals φCARST, φTD, φTS described with FIG. 3, changes of a signal voltage of the vertical signal line VLINE(M) of the M-th column and changes of a signal voltage of the output CAOUT of the column amplifier CAMP described with FIG. 3.

First, a normal operation when a high luminance subject is not present will be described. In FIG. 4, in a period until a first timing T0, the timing signal φRES(n) is input to the gate of the reset transistor Tr4, and the FD part of each pixel (x,M) is reset to a reset voltage.

(Timing T0) The timing signal φRES(n) turns off and the reset of the FD part is released.

(Timing T1) The timing signal φSEL(n) is input to the gate of the selecting transistor Tr3, and a charge accumulated in the FD part is read to the vertical signal line VLINE(M) via the amplifying transistor Tr2. At this time, since the FD part is reset to the reset voltage, the voltage read to the vertical signal line VLINE(M) barely changes.

(Timing T2) When the timing signal φTD is input to the gate of the reset signal accumulating transistor Tr7, the column amplifier CAMP amplifies the signal of the vertical signal line VLINE(M) and accumulates it in the capacitor Ctd via the reset signal accumulating transistor Tr7 from the output CAOUT incidentally, a time of accumulation in the capacitor Ctd is an on period Tcadsh of the timing signal φTD.

(Timing T3) When the timing signal φCARST is input to the gate of the amplifier reset transistor Tr5, the capacitor Cf included in the feedback circuit of the column amplifier CAMP is brought into a short-circuited state. That is, the output CAOUT of the column amplifier CAMP is reset to a voltage of the − input terminal which is in an imaginary short relation with the reference voltage Vref coupled to the + input terminal, and the output CAOUT becomes equal to the reference voltage Vref. Incidentally, a time in which the column amplifier CAMP is reset is an on period Tcarst of the timing signal CARST.

(Timing T4) When the timing signal φCARST turns off, the column amplifier CAMP again amplifies the signal of the vertical signal line VLINE(M) and begins to accumulate it in the capacitor Ctd via the reset signal accumulating transistor Tr7 from the output CAOUT. Incidentally, a time of accumulation in the capacitor Ctd is a period Tcadset until the timing signal φTD turns off.

(Timing T5) When the timing signal φTD turns off, the reset signal accumulating transistor Tr7 is also turned off, and accumulation in the capacitor Ctd from the output CAOUT of the column amplifier CAMP is finished.

(Timing T6) The timing signal φTX(n) is input to the gate of the transfer transistor Tr1, and a charge accumulated in the photodiode PD is transferred to the FD part. At this time, the voltage of the FD part reset to the reset voltage decreases according to the amount of charges transferred from the photodiode PD, and the signal voltage read to the vertical signal line VLINE(M) via the amplifying transistor Tr2 and the selecting transistor Tr1 also decreases.

Further, when the timing signal φTS is input to the gate of the optical signal accumulating transistor Tr6 at the timing T6, the column amplifier CAMP amplifies the signal of the vertical signal line VLINE(M) and accumulates it in the capacitor Cts via the optical signal accumulating transistor Tr6 from the output CAOUT. Incidentally, a time of accumulation in the capacitor Cts is an on period Tcassh of the timing signal φTS.

(Timing T7) The timing signal φTX(n) turns off and the transfer of charge from the photodiode PD to the FD part is finished.

(Timing T8) When the timing signal φTS turns off, the optical signal accumulating transistor Tr6 is also turned off, and the accumulation in the capacitor Cts from the output CAOUT of the column amplifier CAMP is finished.

In this manner, in each pixel P(x,y), a reset signal of the FD part before transferred from the photodiode PD to the FD part is read and accumulated in the capacitor Ctd, and subsequently the optical signal accumulated in the photodiode PD is read and accumulated in the capacitor Cts.

Here, the voltage of the FD part becomes maximum at the timing T0 when the timing signal φRES(n) is turned off, and when the timing signal φTX(n) is turned on and a charge is transferred from the photodiode PD, the voltage of the FD part decreases according to the amount of lights received by the photodiode PD. Therefore, during the normal operation, the voltage of the FD part does not change until the timing T6 when the timing signal φTX(n) turns on, and the voltage of the signal read to the vertical signal line VLINE(M) does not change. The part shown by a parenthesis 201 illustrate how the signal voltages of the vertical signal line VLINE(M) and the output CAOUT of the column amplifier CAMP change during the normal operation. In this case, the voltage of the vertical signal line VLINE(M) when the reset signal is read is Vpdnorm, and the voltage of the vertical signal line VLINE(M) when the optical signal is read is Vpsnorm. A potential difference VIN1 between the optical signal and the reset signal at this time is represented by the following equation.

$$VIN1 = Vpdnorm - Vpsnorm \quad \text{(Equation 1)}$$

Further, the column amplifier CAMP is an inverting amplifier and a gain Gcamp is (−Cin/Cf), and thus the signal voltage of the vertical signal line VLINE(M) is inverted. The voltage of the output CAOUT when the reset signal is read becomes Vdnorm, and the voltage of the output CAOUT when the optical signal is read becomes Vsnorm. A potential difference VOUT1 between the optical signal and the reset signal at this time is represented by the following equation.

$$VOUT1 = Gcamp \times VIN1 \quad \text{(Equation 2)}$$
$$= Vsnorm - Vdnorm$$

In this manner, during the normal operation, the reset signal of the vertical signal line VLINE(M) does not change from the timing T0 to the timing T6, and thus the potential difference VIN1 of the optical signal with respect to the reset signal is kept to be a sufficiently large value. Likewise, the potential difference VOUT1 of the optical signal with respect to the reset signal of the output CAOUT of the column amplifier CAMP is also kept to be a sufficiently large value, and a bright part of the subject is imaged brightly and a dark part is imaged darkly. Incidentally, with the gain in and after the horizontal output circuit 103 being Ghout, the output Vo of the differential amplifier DAMP during the normal operation is represented by the following equation.

$$Vo = Ghout \times VOUT1 \quad \text{(Equation 3)}$$
$$= Ghout \times (Vsnorm - Vdnorm)$$

However, in a digital camera or the like having the imaging device 101, when taking a moving image or displaying a preview image for determining a photographic composition, generally a mechanical shutter to block incidence of a light from a subject on the imaging device 101 is not used, which is a state that a light is incident on the photodiode PD constantly. Normally it would not be a problem because the charge accumulated in the photodiode PD is read to the FD part by the transfer transistor Tr1 before it overflows, but when an intense light of the sun, illumination, or the like is incident on the photodiode PD, there occurs a problem that the charge of the photodiode PD overflows into the FD part even thought the transfer transistor Tr1 is off.

Next, a situation when the charge of the photodiode PD overflows into the FD part will be described. The part shown by a parenthesis 202 in FIG. 4 illustrates how the signal voltage of the vertical signal line VLINE(M) changes and how the signal voltage of the output CAOUT of the column amplifier CAMP changes during the overflow.

At the timing T1 when the timing signal φSEL(n) turns on, the voltage of the vertical signal line VLINE(M) when the reset signal is read is Vpdnorm. However, the voltage of the FD part decreases by an overflow of a charge from the photodiode PD to the FD part, and thus the signal voltage read to the vertical signal line VLINE(M) decreases gradually. Likewise, the output CAOUT of the column amplifier CAMP is inversely amplified according to the decrease of the signal voltage of the vertical signal line VLINE(M) of the input and increases. Incidentally, the reason why the signal voltage of the output CAOUT of the column amplifier CAMP is larger than the signal voltage of the vertical signal line VLINE(M) is because it is increased by the amount of the gain (G=Cf/Cin) of the column amplifier CAMP.

Here, the signal voltage of the vertical signal line VLINE(M) decreases gradually from the timing T1 to the timing T6 by the overflow of the charge from the photodiode PD into the FD part, but the signal voltage of the output CAOUT of the column amplifier CAMP is reset to the reference voltage Vref in the reset period Tcarst of the column amplifier CAMP from the timing T3 to the timing T4. Then from the timing T4 when the reset period Tcarst of the column amplifier CAMP ends, responding to decrease of a signal voltage Vpdovf of the vertical signal line VLINE(M), the signal voltage of the output CAOUT of the column amplifier CAMP is inversely amplified and begins to increase again.

At the timing T5, the timing signal φTD turns off and the accumulation in the capacitor Ctd is finished. However, at this time, the voltage of the FD part has already decreased by the charge overflowed from the photodiode PD, and thus the signal voltage read to the vertical signal line VLINE(M) also decreases to a voltage Vpdset. Likewise, a voltage Vdset inversely amplified in the column amplifier CAMP and accumulated in the capacitor Ctd becomes higher than the voltage Vdnorm accumulated in the capacitor Ctd during the normal operation.

From the following timing T6 to timing T7, the timing signal φTX(n) turns on and the charge accumulated in the photodiode PD is transferred to the FD part. At the timing T8 when reading of the optical signal is finished, the optical signal read to the vertical signal line VLINE(M) becomes a voltage Vpsovf. A potential difference VIN2 with respect to the voltage Vpdset of the reset signal at this time is smaller than the potential difference VIN1 during the normal operation. Note that the potential difference VIN2 between the optical signal and the reset signal is represented by the following equation.

$$VIN2 = Vpdset - Vpsovf \quad \text{(Equation 4)}$$

Further, the optical signal of the output CAOUT of the column amplifier CAMP becomes the voltage Vsovf, and a potential difference VOUT2 with respect to the voltage Vdset of the reset signal is represented by the following equation.

$$VOUT2 = Gcamp \times VIN2 \quad \text{(Equation 5)}$$
$$= Vsovf - Vdset$$

The voltage Vdset of the reset signal in (Equation 5) is higher as compared to the voltage Vdnorm of the reset signal of (Equation 2) during the normal operation, and thus the potential difference VOUT2 between the optical signal and the reset signal during the overflow becomes smaller than the potential difference VOUT1 during the normal operation. Incidentally, the output Vo of the differential amplifier DAMP during the overflow is represented by the following equation similarly to (Equation 3).

$$Vo = Gout \times VOUT2 \quad \text{(Equation 6)}$$
$$= Ghout \times (Vsovf - Vdset)$$

In this manner, although it is originally a bright subject, the subject is displayed darkly on the shooting screen, and in some extreme cases, the sun, illumination with high luminance, or the like is imaged in a blackish color.

In this embodiment, to solve such a problem, the first clip circuit CLP1(M) is provided on the vertical signal line VLINE(M) entering the capacitor Cin on the input side of the column amplifier CAMP, and further the second clip circuit CLP2(M) is provided at the output of the column amplifier CAMP, as shown in FIG. 3.

Figure 5:
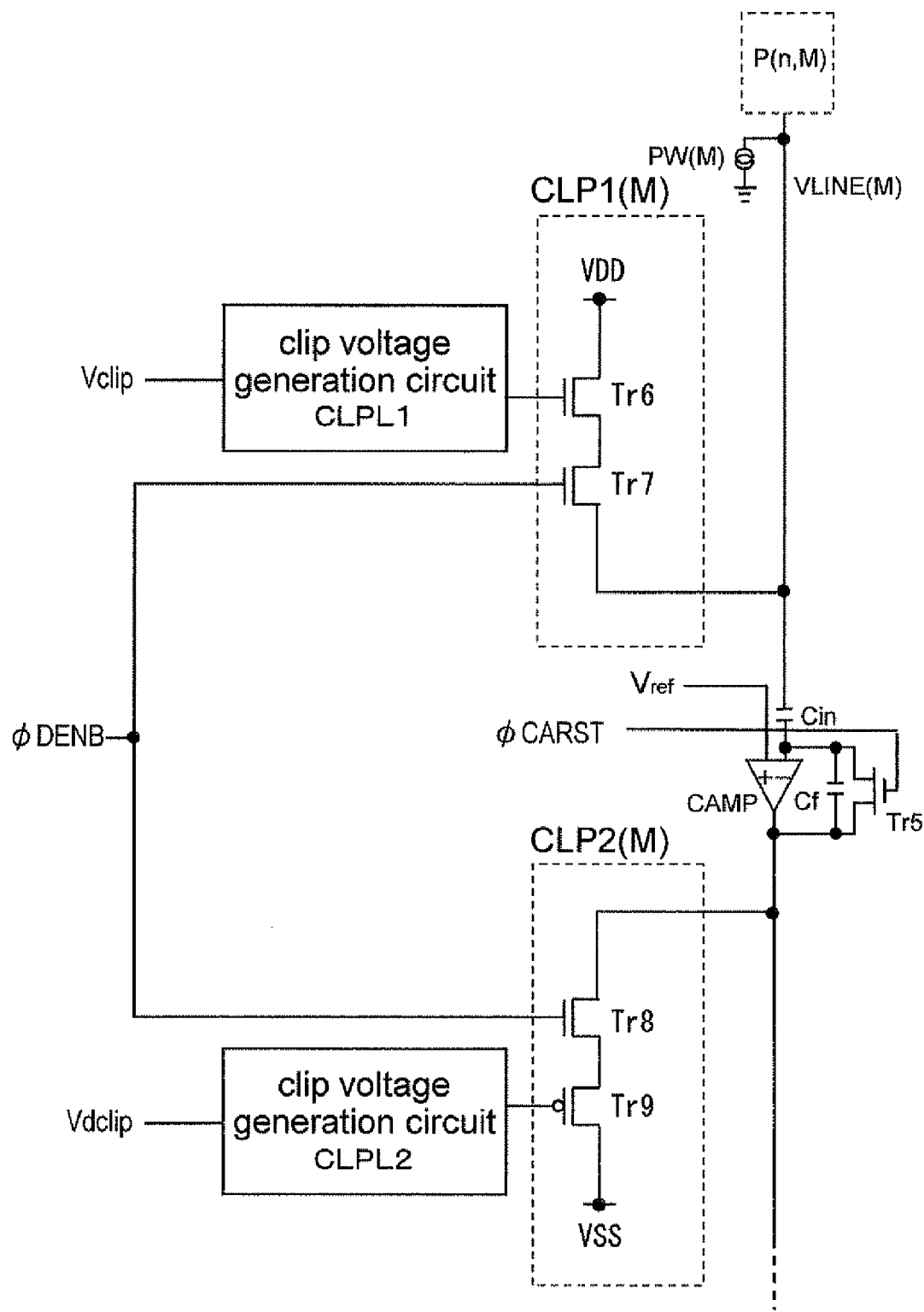
FIG. 5 is a block diagram of a vicinity of a first clip circuit CLP1(M) and a second clip circuit CLP2(M).

Next, the first clip circuit CLP1(M) and the second clip circuit CLP2(M) will be described. FIG. 5 is a block diagram mainly depicting the first clip circuit CLP1(M) and the second clip circuit CLP2(M) disposed in front and back of the column amplifier CAMP, and respective clip voltage generation circuits CLPL1 and CLPL2.

The first clip circuit CLP1(M) is made up of two transistors Tr6 and Tr7 which are coupled in a cascaded manner to clip the signal voltage of the vertical signal line VLINE(M), and the CLP1 of each column is driven by the clip voltage generation circuit CLPL1. In addition, a drain of the transistor Tr6 is coupled to the power supply VDD.

The second clip circuit CLP2(M) is made up of two transistor Tr8 and transistor Tr9 which are coupled in a cascaded manner to clip the signal voltage of the output CAOUT of the column amplifier CAMP, and the CLP2 of each column is driven by the clip voltage generation circuit CLPL2. Incidentally, the transistor Tr9 is a p-channel type transistor and has a drain coupled to a negative power supply VSS.

Further, a timing signal φDENB is input to a gate of the transistor Tr7 and a gate of the transistor Tr8, and a clip voltage Vclip is input to the clip voltage generation circuit CLPL1, and a clip voltage Vdclip is input to the clip voltage generation circuit CLPL2.

Figure 6:
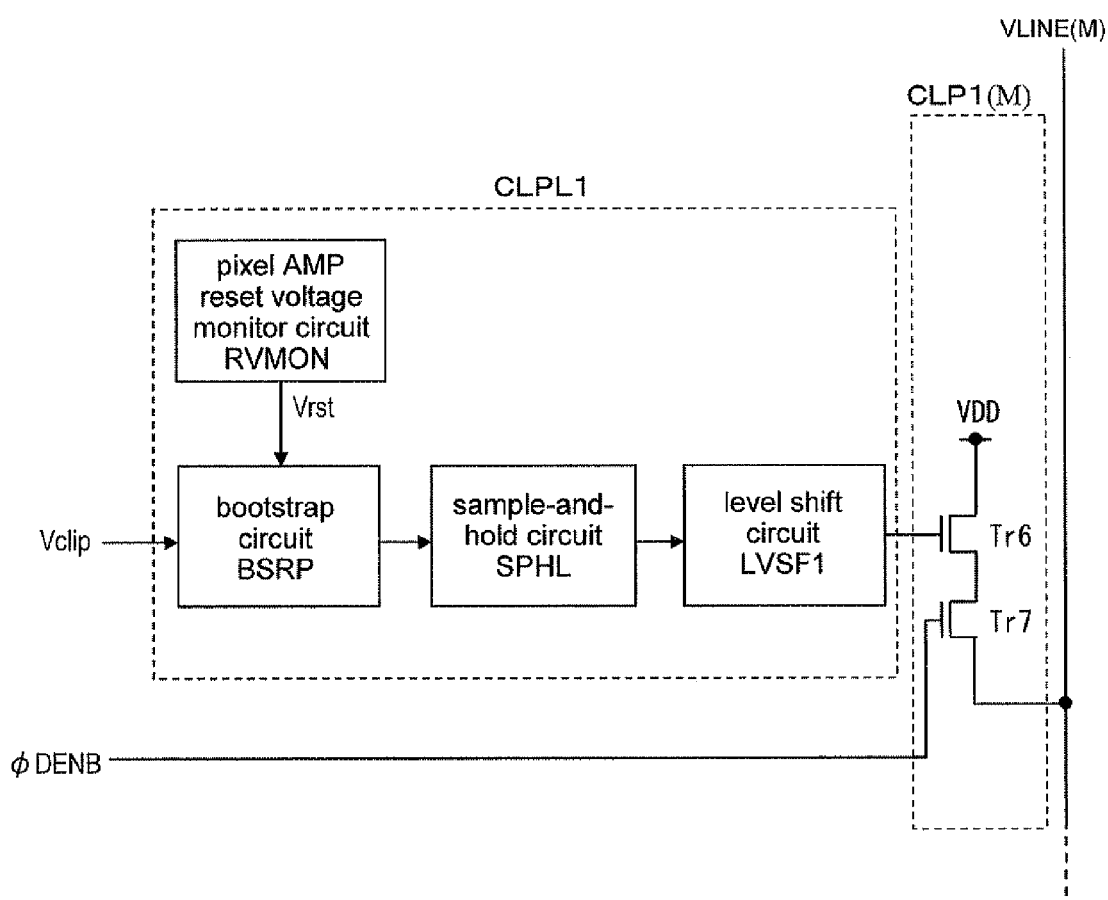
FIG. 6 is a block diagram of a clip voltage generation circuit CLPL1.

Next, the clip voltage generation circuit CLPL1 will be described in detail using FIG. 6. In FIG. 6, the clip voltage generation circuit CLPL1 includes a reset voltage monitor circuit RVMON which monitors the voltage when resetting each pixel P(x,M), a bootstrap circuit BSRP, a sample-and-hold circuit SPHL, and a level shift circuit LVSF1.

Figure 7:
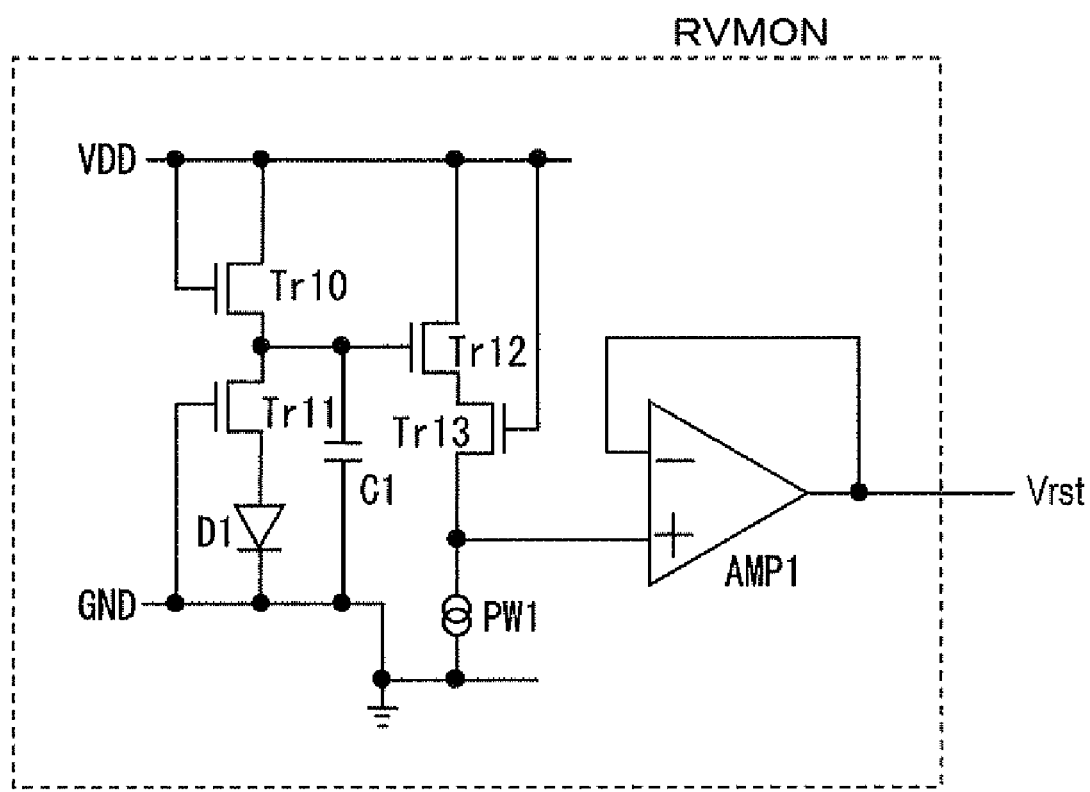
FIG. 7 is a block diagram of a reset voltage monitor circuit RVMON.

Next, a circuit structure of the reset voltage monitor circuit RVMON is shown in FIG. 7. The reset voltage monitor circuit RVMON is formed of a dummy circuit having exactly the same pattern and structure as that of the pixels P, and includes a diode D1 corresponding to the photodiode PD, four transistors Tr11, Tr12, Tr13, and Tr10 corresponding to the transfer transistor Tr1, the amplifying transistor Tr2, the selecting transistor Tr3, and the reset transistor Tr4 respectively, a capacitor C1 corresponding to the FD part, a constant current generator PW1 corresponding to the constant current generator PW(M), and an output buffer AMP1. The reset voltage monitor circuit RVMON generates a reset voltage Vrst read to the vertical signal line VLINE(M) in a representative form when the ED part of each pixel P(x,M) is reset.

Figure 8A:
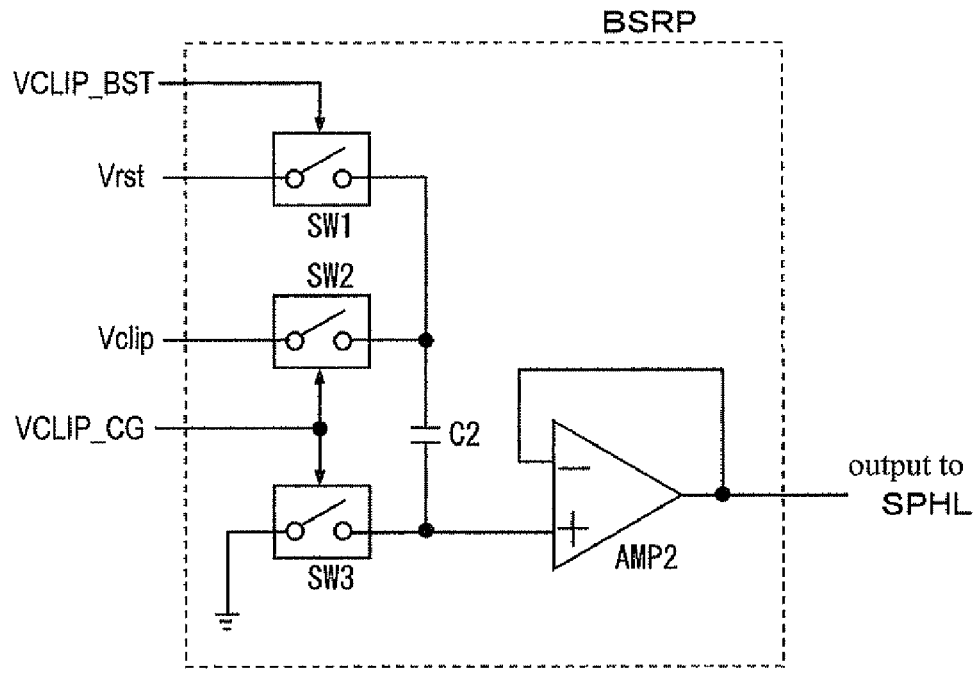
FIG. 8 are a block diagram of a bootstrap circuit BSRP.
Figure 8B:
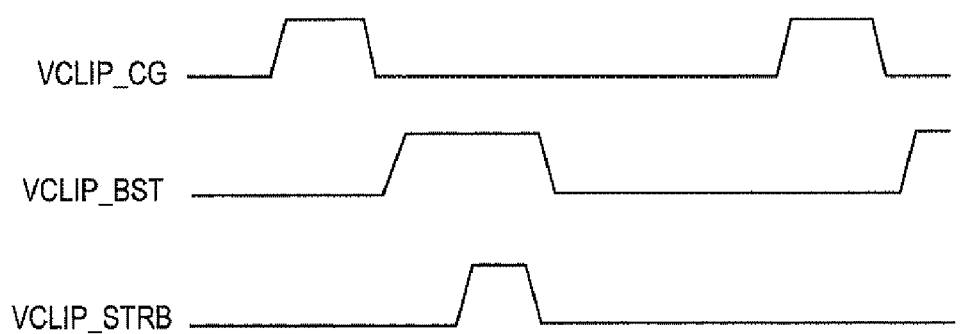

Next, the bootstrap circuit BSRP will be described in detail using FIG. 8. In FIG. 8(a), the bootstrap circuit BSRP includes three switches SW1-SW3 formed of a transistor and so on, a capacitor C2, and an output buffer AMP2. The switch SW1 is turned on and off by a control signal VCLIP_BST to input the reset voltage Vrst of the reset voltage monitor circuit RVMON described with FIG. 7 and hold it in the capacitor C2. The switch SW2 is turned on and off by a control signal VCLIP_CG to input the clip voltage Vclip input from the outside and hold it in the capacitor C2. The switch SW3 is also turned on and off by the control signal VCLIP_CG to couple the capacitor C2 to the ground potential. That is, the control signal VCLIP_CG causes the clip voltage Vclip based on the ground potential to be held in the capacitor C2. The voltage held in the capacitor C2 is output to the sample-and-hold circuit SPHL via the output buffer AMP2 depending on the states of the switches SW1-SW3, That is, the GND potential is not used as a reference potential, but the reset voltage Vrst is used as a reference potential for giving the clip voltage Vclip. As illustrated in FIG. 8(b), when the control signal VCLIP_CG turns on first, the clip voltage Vclip of the ground potential reference is held in the capacitor C2. Then, when the control signal VCLIP_CG turns off and the control signal VCLIP_BST turns on, the voltage held in the capacitor C2 with the reset voltage Vrst being the reference potential is output from the output buffer AMP2. Incidentally, a control signal VCLIP_STRB is a signal to give the sample-and-hold circuit SPHL a timing to hold. Further, each of the control signal VCLIP_BST, the control signal VCLIP_CG, and the control signal VCLIP_STRB is generated in the imaging device 101 based on the timing signals of the vertical scanning circuit 102.

Figure 9:
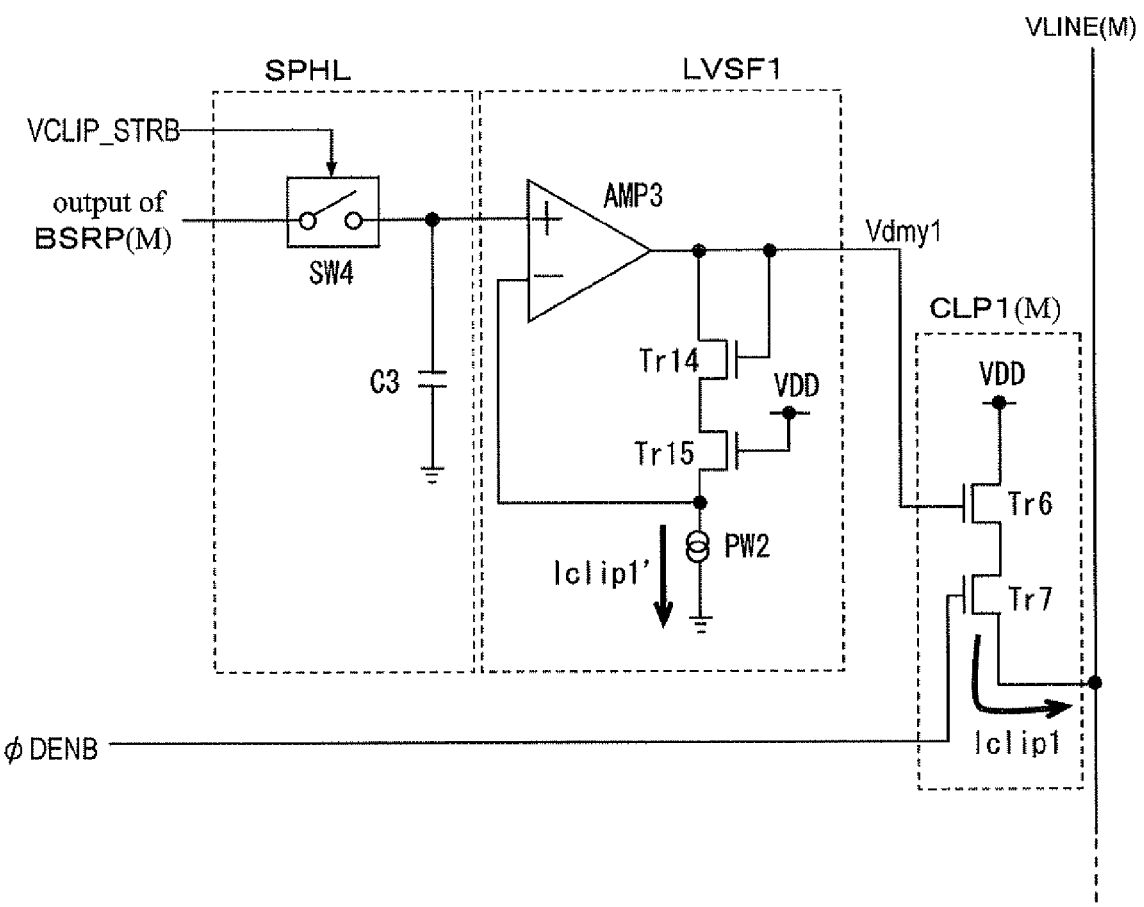
FIG. 9 is a block diagram of a sample-and-hold circuit SPHL and a level shift circuit LVSF1.

The sample-and-hold circuit SPHL is structured as shown in FIG. 9, and when the control signal VCLIP_STRB is input to a switch SW4, it holds the output voltage of the bootstrap circuit BSRP in a capacitor C3. The voltage held in the capacitor C3 is input to the level shift circuit LVSF1.

The level shift circuit LVSF1 includes a transistor Tr14 and a transistor Tr15 forming a dummy circuit of the transistor Tr6 and the transistor Tr7 performing clipping of a signal voltage of each vertical signal line VLINE, a constant current generator PW2, and an operational amplifier AMP3. The voltage held in the capacitor C3 of the sample-and-hold circuit SPHL is input to a + input terminal of the operational amplifier AMP3, and an output voltage Vdmy1 is output to the gate of the transistor Tr6 depending on this voltage. Here, since the level shift circuit LVSF1 forms the dummy circuit of the transistor Tr6 and the transistor Tr7, a current Iclip1' flowing through the constant current generator PW2 of the level shift circuit LVSF1 and a current Iclip1 flowing through the transistor Tr6 and the transistor Tr7 are set to the same current value.

Now, when the voltage to clip the signal voltage of each vertical signal line VLINE is Vclip, a voltage raised by the threshold voltage Vt of the transistor Tr6 (Vclip+Vt) has to be given to the gate of the transistor Tr6 in practice. However, since the dummy circuit of the transistor Tr6 and the transistor Tr7 is formed by the transistor Tr14 and the transistor Tr15 in the level shift circuit LVSF1 shown in FIG. 9, the voltage Vdmy1 higher by the voltage Vt than the voltage of the capacitor C3 of the sample-and-hold circuit SPHL is output automatically to the gate of the transistor Tr6. Accordingly, it becomes not necessary to consider the amount of drop by the voltage Vt for the clip voltage Vclip given from the outside. In general, Vt of the MOS transistor disperses between lots and between wafers, but dispersion in the same chip is small and hence Vt cancelling by the dummy circuit is effective.

Figure 10A:
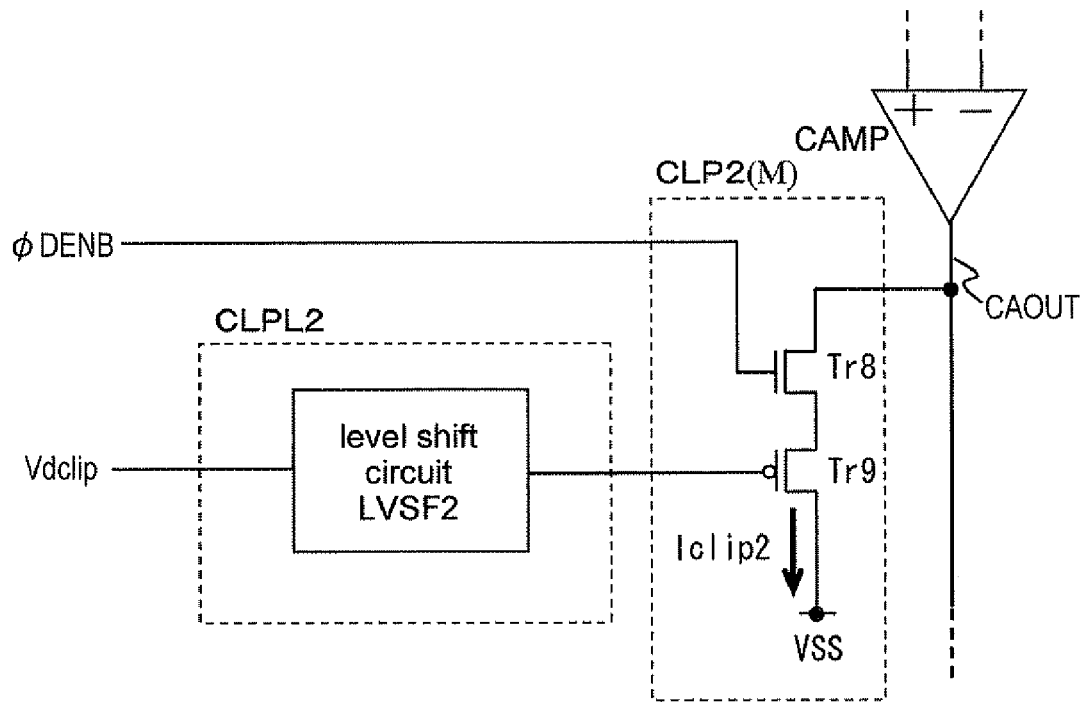
FIG. 10 are a block diagram of a clip voltage generation circuit CLPL2.

Next, the second clip circuit CLP2(M) will be described in detail using FIG. 10. In FIG. 10(a), the second clip circuit CLP2(M) is made up of two transistor Tr8 and transistor Tr9 which are coupled in a cascaded manner to clip the signal voltage of the output CAOUT of the column amplifier CAMP, and the CLP2 of each column is driven by the clip voltage generation circuit CLPL2. Incidentally, the timing signal φDENB is input to a gate of the transistor Tr8, so as to control on/off of a clip operation. Further, the transistor Tr9 is a p-channel type transistor having a drain coupled to the negative power supply VSS, and the clip current Iclip2 flows therethrough.

Figure 10B:
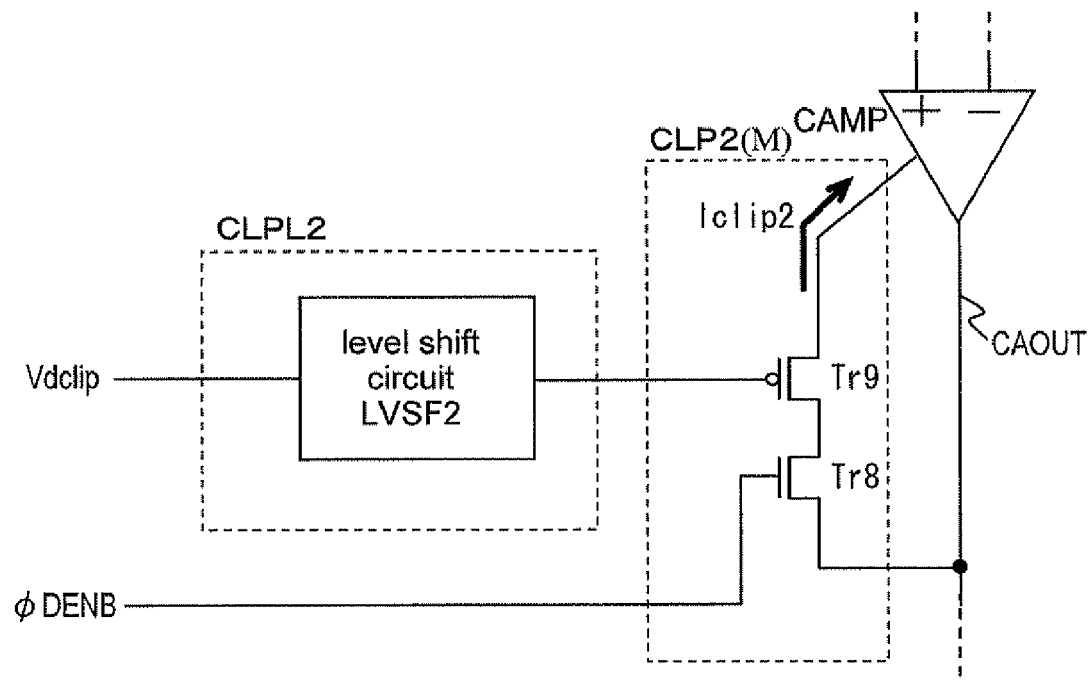

Here, it is all right to couple a drain of the transistor Tr9 of the second clip circuit CLP2(M) to the negative power supply VSS as shown in FIG. 10(a), but in practice it is desired to be coupled to a Tail Node of the column amplifier CAMP as shown in FIG. 10(b). The Tail Node is a constant current generator of the column amplifier CAMP. By allowing the current in the column amplifier CAMP and the clip current Iclip2 flowing through the transistor Tr8 and the transistor Tr9 to flow into the constant current generator of the same column amplifier CAMP, fluctuation of the current flowing into the ground line of the column amplifier CAMP becomes small. Thus, the S/N ratio of an image signal can be improved, and the current consumption when clipping occurs can be made small.

Figure 11A:
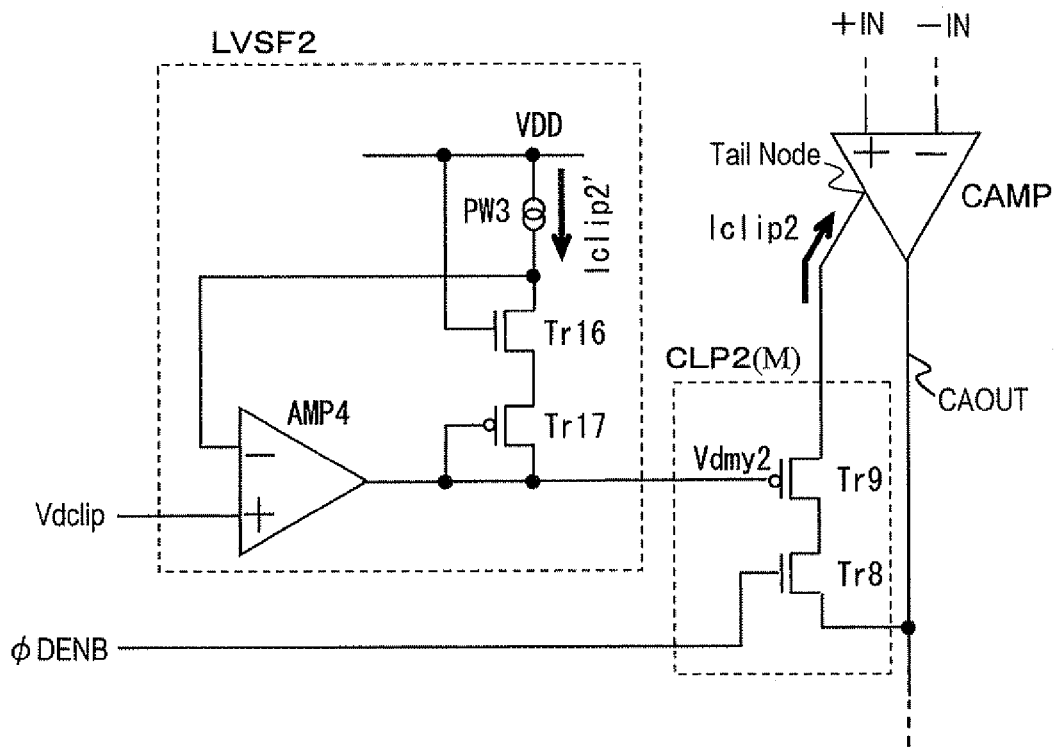
FIG. 11 are a block diagram of a level shift circuit LVSF2.

Next, a level shift circuit LVSF2 forming the clip generation circuit CLPL2 will be described in detail using FIG. 11. In FIG. 11(a), the level shift circuit LVSF2 is formed of the same circuit as the level shift circuit LVSF1 of each first clip circuit CLP1(M) shown in FIG. 9. The level shift circuit LVSF2 includes a transistor Tr16 and a transistor Tr17 forming a dummy circuit of the transistor Tr8 and the transistor Tr9 performing clipping of the output CAOUT of the column amplifier CAMP, a constant current generator PW3, and an operational amplifier AMP4. The clip voltage Vdclip is input to a + input terminal of the operational amplifier AMP4, and an output voltage Vdmy2 is output to a gate of the transistor Tr9 depending on this voltage. Here, since the level shift circuit LVSF2 forms the dummy circuit of the transistor Tr8 and the transistor Tr9, a current Iclip2' flowing through the constant current generator PW3 of the level shift circuit LVSF2(M) and a current Iclip2 flowing through the transistor Tr8 and the transistor Tr9 are set to the same current value. Incidentally, as previously described, the current Iclip2 flowing through the transistor Tr8 and the transistor Tr9 is coupled to the Tail Node of the column amplifier CAMP, and flows to the constant current generator of the column amplifier CAMP.

Figure 11B:
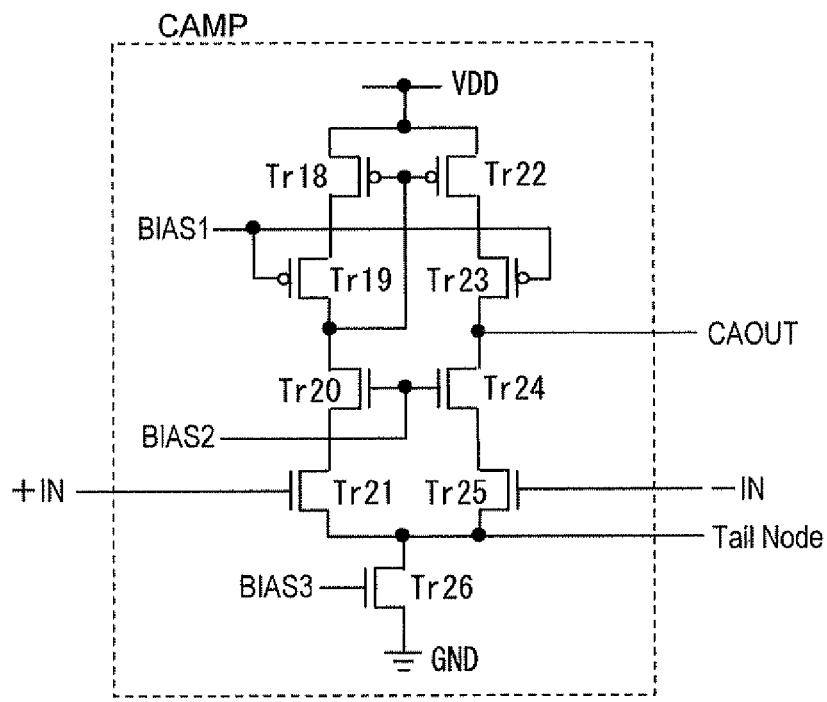

Here, an example of an equivalent circuit of the column amplifier CAMP will be described using FIG. 11(b). FIG. 11(b) is an equivalent circuit of a double cascade differential amplifier, in which a low voltage current mirror circuit on a load side is formed with a cascade pair of a transistor Tr18 and a transistor Tr19 and a cascade pair of a transistor Tr22 and a transistor Tr23. Likewise, a low voltage current mirror circuit on a differential input side is formed with a cascade pair of a transistor Tr20 and a transistor Tr21 and a cascade pair of a transistor Tr24 and a transistor Tr25. The cascade pair on the differential input side is coupled to GND via a transistor Tr26 as a current source. Further, a bias BIAS1 is given to gates of the transistor Tr19 and the transistor Tr23, a bias BIAS2 to gates of the transistor Tr20 and the transistor Tr24, and a bias BIAS3 to a gate of the transistor Tr26. A constant current is allowed to flow through the transistor Tr26 forming the current source of the column amplifier CAMP, and thus an operational current of the column amplifier CAMP and the clip current Iclip2 of the second clip circuit CLP2(M) can together be retained as a constant current by coupling the drain of the transistor Tr9 of FIG. 11(a) to the transistor Tr26 as the current source via the Tail Node terminal of the column amplifier CAMP.

Next, a timing chart and changes of signal voltages when the first clip circuit CLP1(M) and the second clip circuit CLP2(M) are operated in FIG. 3 will be described using FIG. 12. Note that the same reference letters as those in the timing chart of FIG. 4 denote the same elements. A difference from the timing chart of FIG. 4 is that the timing signal φDENB controlling clip operations of the first clip circuit CLP1(M) and the second clip circuit CLP2(M) is added. Further, the part shown by a parenthesis 203 shows changes of the signal voltages of the vertical signal line VLINE(M) and the output CAOUT of the column amplifier CAMP during the overflow. For convenience of comparison, the changes of the voltages during the overflow shown by the parenthesis 202 in FIG. 4 are depicted with dotted lines. Incidentally, changes of the signal voltages during the normal operation when a high luminance subject is not present are the same as those in FIG. 4.

Up to the timing T2, the signal voltage of the output CAOUT of the column amplifier CAMP is exactly the same as the change of the voltage during the overflow shown by the parenthesis 202 in FIG. 4. However, at the timing T2, the timing signal φDENB controlling clip operations of the first clip circuit CLP1(M) and the second clip circuit CLP2(M) turns on, and when the signal voltage of the output CAOUT of the column amplifier CAMP exceeds Vdclip, the second clip circuit CLP2(M) operates to fix the signal voltage of the output CAOUT to Vdclip.

On the other hand, at the timing T9, the signal voltage of the vertical signal line VLINE(M) is exactly the same as the change of the voltage during the overflow shown by the parenthesis 202 in FIG. 4. However, when the signal voltage of the vertical signal line VLINE(M) exceeds Vclip at the timing T9, the first clip circuit CLP1(M) operates to fix the signal voltage of the vertical signal line VLINE(M) to Vclip.

At the next timing T3, the signal voltage of the output CAOUT of the column amplifier CAMP is reset to the reference voltage Vref given to the + input terminal of the column amplifier CAMP, similarly to during the overflow shown by the parenthesis 202 in FIG. 4.

At the next timing T4, the signal voltage of the output CAOUT of the column amplifier CAMP begins to increase during the overflow shown by the parenthesis 202 in FIG. 4, but here the signal voltage of the output CAOUT of the column amplifier CAMP does not change and stays at Vref because the signal voltage of the vertical signal line VLINE(M) is fixed to Vclip at the timing T4 due to the operation of the first clip circuit CLP1(M).

At the next timing T5, similarly, the signal voltage of the vertical signal line VLINE(M) and the signal voltage of the output CAOUT of the column amplifier CAMP do not change.

At the next timing T6, the timing signal φDENB controlling clip operations of the first clip circuit CLP1(M) and the second clip circuit CLP2(M) turns off. Further, the timing signal φTX(n) turns on, transfer of the charge accumulated in the photodiode PD to the FD part begins, and the signal voltage of the vertical signal line VLINE(M) increases according to the magnitude of the optical signal until the timing T7 when reading of the optical signal is finished. Accordingly, the signal voltage of the output CAOUT of the column amplifier CAMP as the inverting amplifier also increases.

At the next timing T7, the transfer of the charge accumulated in the photodiode PD to the FD part is finished.

At the next timing T8, the timing signal φTS turns off, and charging to the capacitor Cts for optical signal accumulation is finished. At this time, the signal voltage of the vertical signal line VLINE(M) is at Vpsovf similarly to FIG. 4. However, unlike during the overflow shown by the parenthesis 202 in FIG. 4, the optical signal of the vertical signal line VLINE(M) is the same at the voltage Vpsovf, but the operation of the first clip circuit CLP1(M) suppresses the reset signal at the clip voltage Vclip (Vpdovf) of the first clip circuit CLP1(M). A potential difference VIN3 between the optical signal and the reset signal at this time is represented by the following equation.

$$VIN3 = Vclip - Vpsovf \qquad \text{(Equation 7)}$$

Likewise, the voltage of the optical signal of the output CAOUT of the column amplifier CAMP is at Vsvof which is the same as in FIG. 4, but unlike during the overflow shown by the parenthesis 202 in FIG. 4, the operation of the first clip circuit CLP1(M) suppresses a voltage Vdset3 of the reset signal at the same value as the voltage Vref. As a result, a potential difference VOUT3 between the voltage Vsovf and the voltage Vdset3 is larger than the potential difference VOUT2 during the overflow shown by the parenthesis 202 in FIG. 4, and becomes equal to the potential difference VOUT1 during the normal operation shown by the parenthesis 201. The potential difference VOUT3 between the optical signal and the reset signal of the output CAOUT of the column amplifier CAMP at this time is represented by the following equation.

$$VOUT3 = Gcamp \times VIN3 \qquad \text{(Equation 8)}$$
$$= Vsovf - Vdset3$$

In (Equation 8), since Vdset3=Vref holds true, VOUT3=Vout1 holds true. Incidentally, the output Vo of the differential amplifier DAMP at this time is represented by the following equation similarly to (Equation 3).

$$Vo = Ghout \times VOUT3 \qquad \text{(Equation 9)}$$
$$= Ghout \times (Vsovf - Vdset3)$$
$$= Ghout \times (Vsovf - Vref)$$
$$= Ghout \times VOUT1$$

Thus, the operation of the first clip circuit CLP1(M) causes (Equation 9) to be the same as the output Vo (Equation 3) of the differential amplifier DAMP during the normal operation, and when the charge of the photodiode PD overflows into the FD part, a bright part of the subject can be imaged brightly and a dark part can be imaged darkly. Incidentally, the clip voltage Vclip of the first clip circuit CLP1(M) is set in advance and is given from the outside of the imaging device 101.

Figure 13:
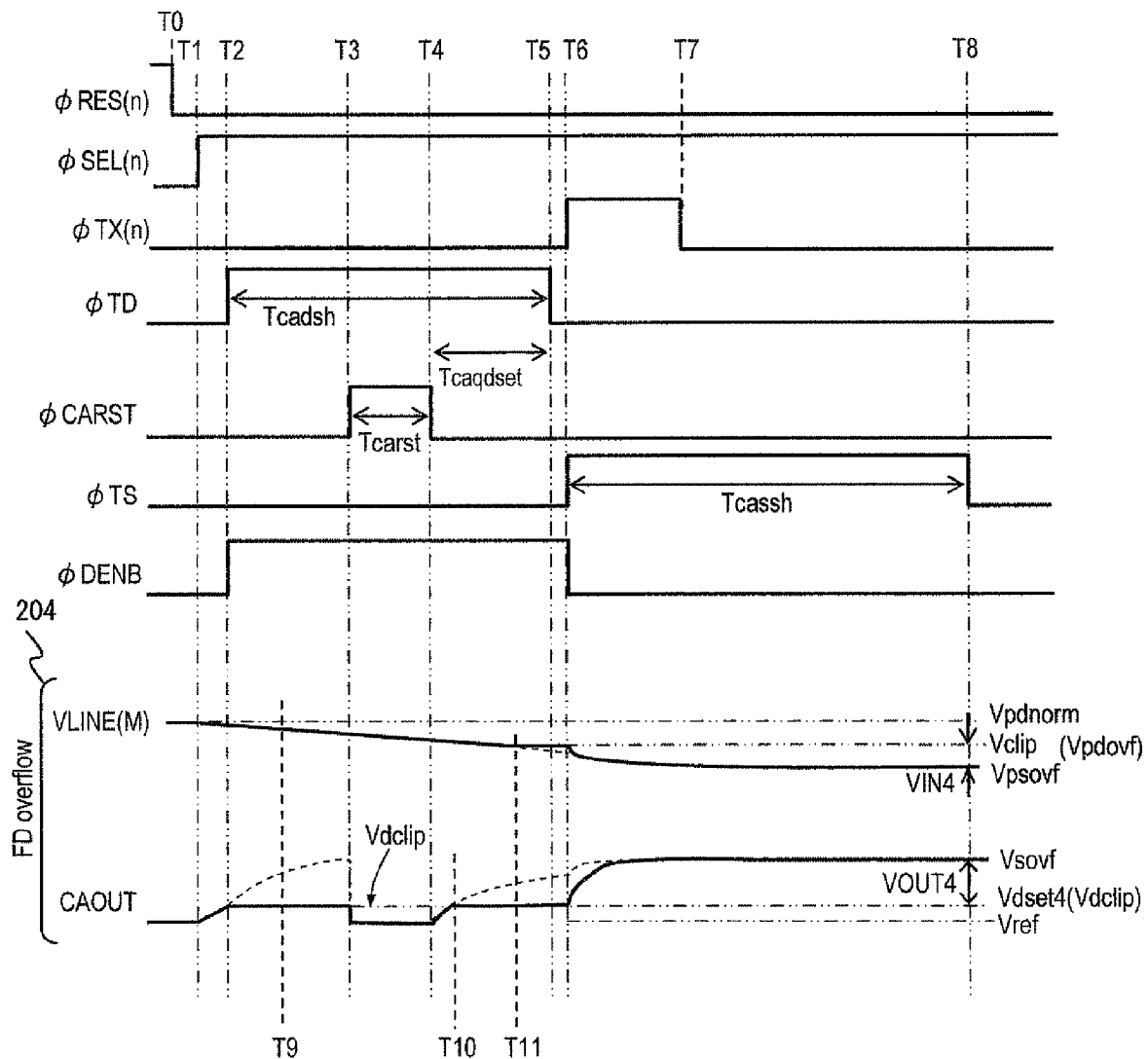
FIG. 13 shows a timing chart and output signal waveforms when a column amplifier CAMP has a high gain.

Next, when the column amplifier CAMP has a high gain will be described using FIG. 13. When the column amplifier CAMP has a high gain, a signal range handled by the vertical signal lines VLINE is generally a signal with a relatively small amplitude of 0.1 V to 0.5 V or less. Thus, the level of an overflow occurring under such an environment is possibly a relatively small level.

Further, the accuracy of the clip voltage of the first clip circuit CLP1(M) is difficult to be set in close proximity to the above-described signal level, in view of the influence of a weak inversion region of a MOS transistor and a Vt dispersion in elements.

Incidentally, the clip voltage Vclip of the first clip circuit CLP1(M) on the input side of the column amplifier CAMP is set relatively high for preventing a malfunction because the signal range handled by the vertical signal lines VLINE is a signal with a relatively small amplitude. On the other hand, the clip voltage Vdclip of the second clip circuit CLP2(M) on the output side of the column amplifier CAMP becomes a signal with a larger amplitude than the input side of the column amplifier CAMP making it easy to control the clip voltage, and is set relatively low. Accordingly, the second clip circuit CLP2(M) on the output side of the column amplifier CAMP operates earlier than the first clip circuit CLP1(M) on the input side of the column amplifier CAMP.

Therefore, effective signal clipping on the input side of the column amplifier CAMP under this condition is difficult, and signal clipping on the output side of the column amplifier CAMP is important as will be described below.

Hereinafter, the same reference letters as those in the timing chart of FIG. 12 denote the same elements. Differences from the timing chart of FIG. 12 are that the signal voltage of the vertical signal line VLINE(M) does not exceed the clip voltage Vclip of the first clip circuit CLP1(M) until a timing T11, and that the signal voltage of the vertical signal line VLINE(M) is relatively small since the column amplifier CAMP has a high gain. When the column amplifier CAMP has a high gain, the signal voltage of the output CAOUT exceeds the clip voltage Vdclip of the second clip circuit CLP2(M) between the timing T4 and the timing T11 in which the first clip circuit CLP1(M) is not operating. Accordingly, at the timing T10, the output CAOUT of the column amplifier CAMP exceeds the clip voltage Vdclip of the second clip circuit CLP2(M) and is fixed to Vdclip.

Finally, a potential difference VIN4 between the optical signal and the reset signal of the vertical signal line VLINE(M) at the timing T8 is represented by the following equation similarly to VIN3 of (Equation 7).

$$VIN4 = Vclip - Vpsovf \qquad \text{(Equation 10)}$$
$$(= Vin3)$$

Figure 12:
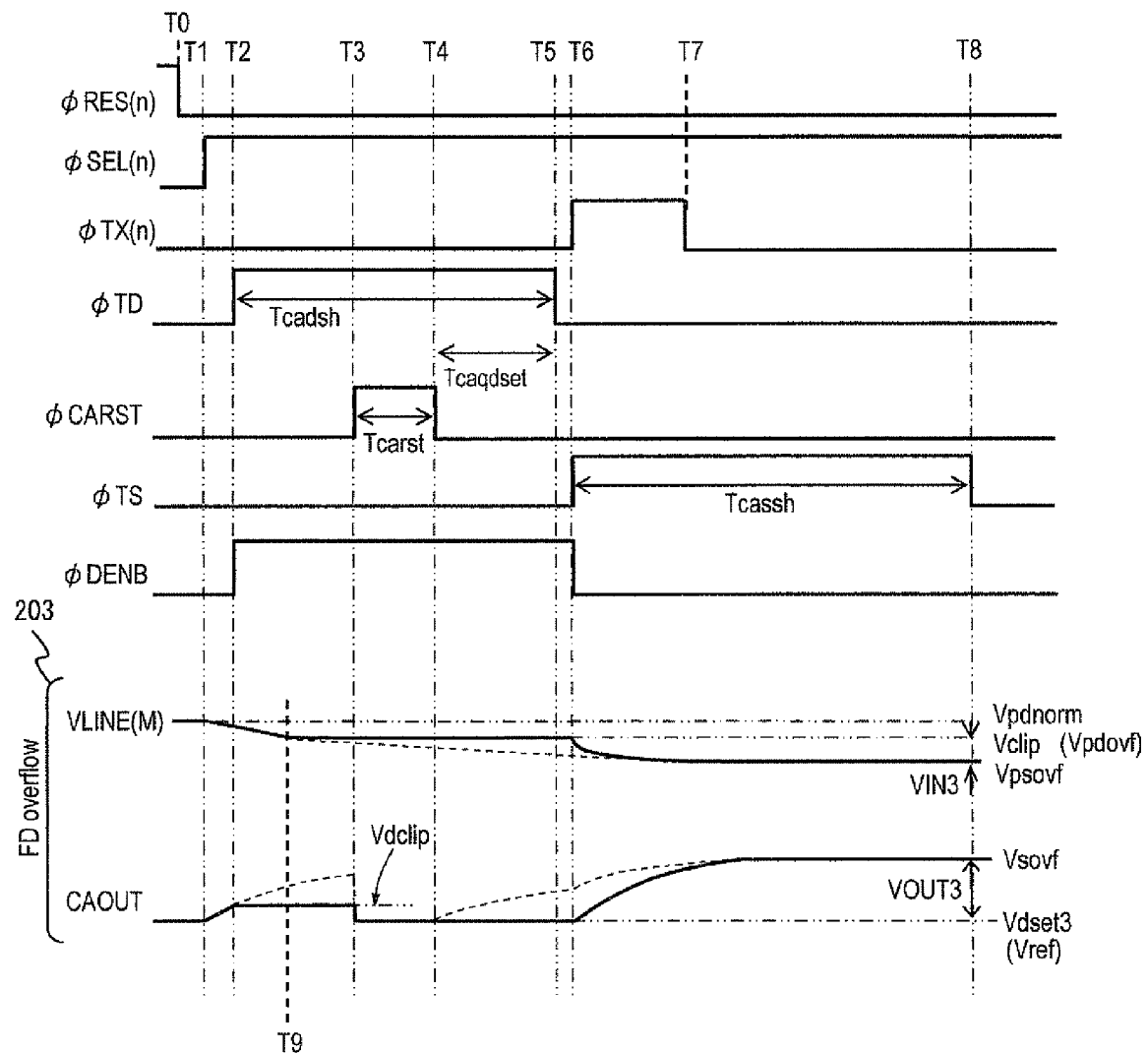
FIG. 12 shows a timing chart and output signal waveforms when the first clip circuit CLP1(M) and the second clip circuit CLP2(M) are operated.

Further, the signal voltage of the output CAOUT of the column amplifier CAMP is at Vsovf which is the same as in FIG. 12, but unlike during the overflow shown by the parenthesis 202 in FIG. 4, the effect of the second clip circuit CLP2(M) suppresses a voltage Vdset4 of the reset signal at the clip voltage Vdclip. Thus, a potential difference VOUT4 between the voltage Vsovf and the voltage Vdset4 can be kept larger than the potential difference VOUT2 during the overflow shown by the parenthesis 202 in FIG. 4. The potential difference VOUT4 between the optical signal and the reset signal of the output CAOUT of the column amplifier CAMP at this time is represented by the following equation.

$$VOUT4 = Vsovf - Vdset4 \qquad \text{(Equation 11)}$$
$$= Vsovf - Vdclip$$

The output Vo of the differential amplifier DAMP at this time is represented by the following equation similarly to (Equation 3).

$$V0 = Ghout \times VOUT4 \qquad \text{(Equation 12)}$$
$$= Ghout \times (Vsovf - Vdclip)$$

Incidentally, the clip voltage Vdclip of the second clip circuit CLP2(M) may be set to a value to the extent that a white level of the output voltage Vo of the differential amplifier DAMP can be secured. Further, the clip voltage Vdclip is set in advance similarly to the clip voltage Vclip of the first clip circuit CLP1(M), and is given from the outside of the imaging device 101.

Thus, when the column amplifier CAMP has a high gain, the operation of the second clip circuit CLP2(M) enables to keep the potential difference between the optical signal and the reset signal of the output CAOUT of the column amplifier CAMP large, and it is possible to prevent a gradation inversion phenomenon of the sun, illumination with high luminance, or the like. Thus, displaying and imaging in a state close to the reality can be performed.

Here, in the above description, the case where the column amplifier CAMP has a high gain is described. However, even when the column amplifier CAMP has a fixed gain, there occurs a similar problem that a part where incident light intensity is high is imaged in a blackish color. Even when the column amplifier CAMP has such a fixed gain, the imaging device 101 according to this embodiment can avoid a problem that a part where incident light intensity is high is imaged in a blackish color. Next, operations of the imaging device 101 when the column amplifier CAMP has a fixed gain and the incident light intensity is moderately high or high will be described.

Figure 14:
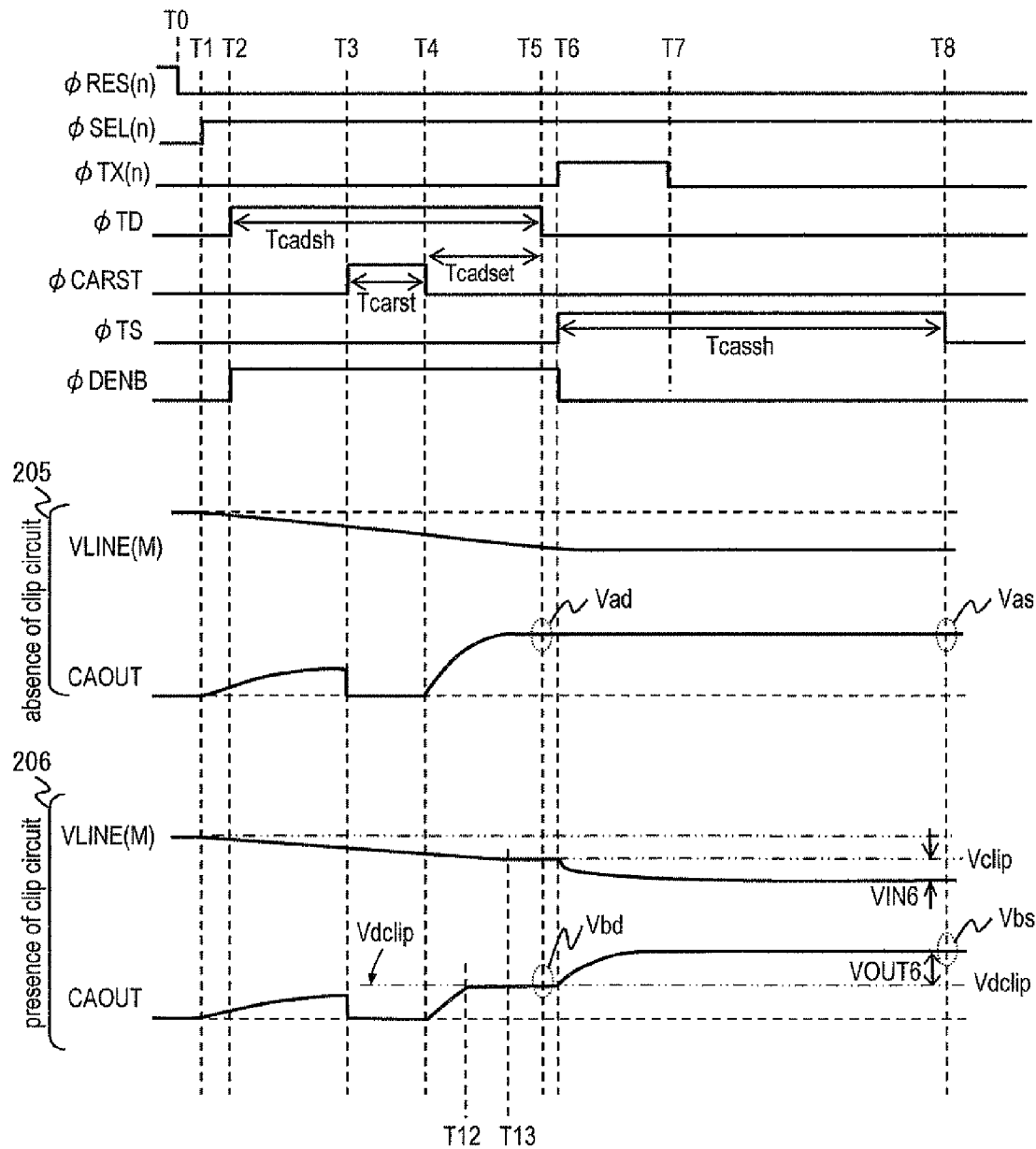
FIG. 14 shows output signal waveforms when light intensity incident in the imaging device 101 is moderately high (the column amplifier CAMP has a fixed gain).

FIG. 14 depicts changes of the signal voltage of the vertical signal line VLINE(M) and changes of the signal voltage of the output CAOUT of the column amplifier CAMP when the column amplifier CAMP has a fixed gain and light intensity to be incident in the imaging device 101 is moderately high. Incidentally, in FIG. 14, the timing signals φRES(n), φTX(n), φSEL(n), φCARST(n), φTD, φTS, DENB described with FIG. 4, FIG. 12, and FIG. 13 are the same. Further, timings T0 to T8 shown in FIG. 14 denote the same timing positions as the timings T0 to T8 described in FIG. 4, FIG. 12, and FIG. 13. Moreover, signal waveforms during the normal operation when the charge of the photodiode PD does not overflow into the FD part are the same as those during the normal operation 201 shown in FIG. 4.

In FIG. 14, when the overflow of charge occurs but as is conventional the first clip circuit CLP1(M) or the second clip circuit CLP2(M) does not operate, changes of the signal voltage of the vertical signal line VLINE(M) and changes of the signal voltage of the output CAOUT of the column amplifier CAMP are as shown by absence of clip circuit 205. The signal voltage of the vertical signal line VLINE(M) in the absence of clip circuit 205 increases gradually toward the timing T6 to read the optical signal since the charge of the photodiode PD overflows into the ED part by a moderately intense incident light. On the other hand, the signal voltage of the output CAOUT of the column amplifier CAMP begins to increase from the timing T1 when it is output from the vertical signal line VLINE(M). The column amplifier CAMP is once reset in the column reset period from the timing T3 to the timing T4 and the output CAOUT becomes zero, but it increases again in a reading period of a dark signal from the timing T4 to the timing T5. At the timing T5 when the dark signal is latched in the capacitor Ctd, the output CAOUT becomes an output voltage Vad in an almost saturated sate. Thereafter, in a reading period of the optical signal from the timing T6 to the timing T8, the output voltage Vad of the optical signal barely changes, and at the timing T8 when the optical signal is latched in the capacitor Cts, the output CAOUT is still a voltage Vas in an almost saturated state. As a result, the potential difference between the dark signal voltage (Vad) latched in the capacitor Ctd and the optical signal voltage (Vas) latched in the capacitor Cts vanishes. Specifically, the potential difference between the dark signal Vdark latched in the capacitor Ctd and the optical signal Vsignal latched in the capacitor Cts in FIG. 3 becomes almost zero, and the image signal output from the imaging device 101 via the horizontal output circuit 103 and the differential amplifier DAMP becomes a black level.

In this aspect, when the first clip circuit CLP1(M) and the second clip circuit CLP2(M) of the imaging device 101 according to this embodiment operate, changes of the signal voltage of the vertical signal line VLINE(M) and changes of the signal voltage of the output CAOUT of the column amplifier CAMP are as shown by presence of clip circuit 206 in FIG. 14. The signal voltage of the vertical signal line VLINE (M) in the presence of clip circuit 206 increases gradually toward the timing T6 to read the optical signal because the charge of the photodiode PD overflows into the FD part due to the moderately intense incident light. Then, the first clip circuit CLP1(M) operates at a timing T13 slightly before the timing T5 to latch the dark signal, and the first clip circuit CLP1(M) holds it at the clip voltage Vclip until the timing T6 when the operation turns off. On the other hand, a signal voltage of the output CAOUT of the column amplifier CAMP is the same as that in the absence of clip circuit 205 until the point of time when the column reset is finished at the timing T4. Then the second clip circuit CLP2(M) operates at a timing T12 in the middle of the reading period of the dark signal from the timing T4 to the timing T5, and the second clip circuit CLP2(M) holds it at the clip voltage Vdclip until the timing T6 when its operation turns off. As a result, a potential difference VOUT6 is secured between a dark signal voltage (Vbd) latched in the capacitor Ctd and an optical signal voltage (Vbs) latched in the capacitor Cts. That is, in FIG. 3, the potential difference VOUT6 between the dark signal Vdark latched in the capacitor Ctd and the optical signal Vsignal latched in the capacitor Cts is obtained, and the image signal output from the imaging device 101 via the horizontal output circuit 103 and the differential amplifier DAMP does not become a black level.

Here, as described previously, since the second clip circuit CLP2(M) on the output side of the column amplifier CAMP operates earlier than the first clip circuit CLP1(M) on the input side of the column amplifier CAMP, if there is only the first clip circuit CLP1(M) the saturated state of the output CAOUT of the column amplifier CAMP becomes high from the timing T12 to the timing T13 in FIG. 14, and the output CAOUT is clipped at the timing T13 when the first clip circuit CLP1(M) operates. Thus, the dark signal voltage (Vbd) becomes high at the timing T5 when the dark signal is latched in the capacitor Ctd, and the potential difference VOUT6 with the optical signal voltage (Vbs) latched in the capacitor Cts at the timing T8 becomes small.

Thus, even when a light with moderately high intensity is incident, the imaging device 101 according to this embodiment is able to prevent a bright image from being output in a blackish color by the operation of the second clip circuit CLP2(M).

Next, operations of the imaging device 101 when a higher intensity light is incident will be described.

Figure 15:
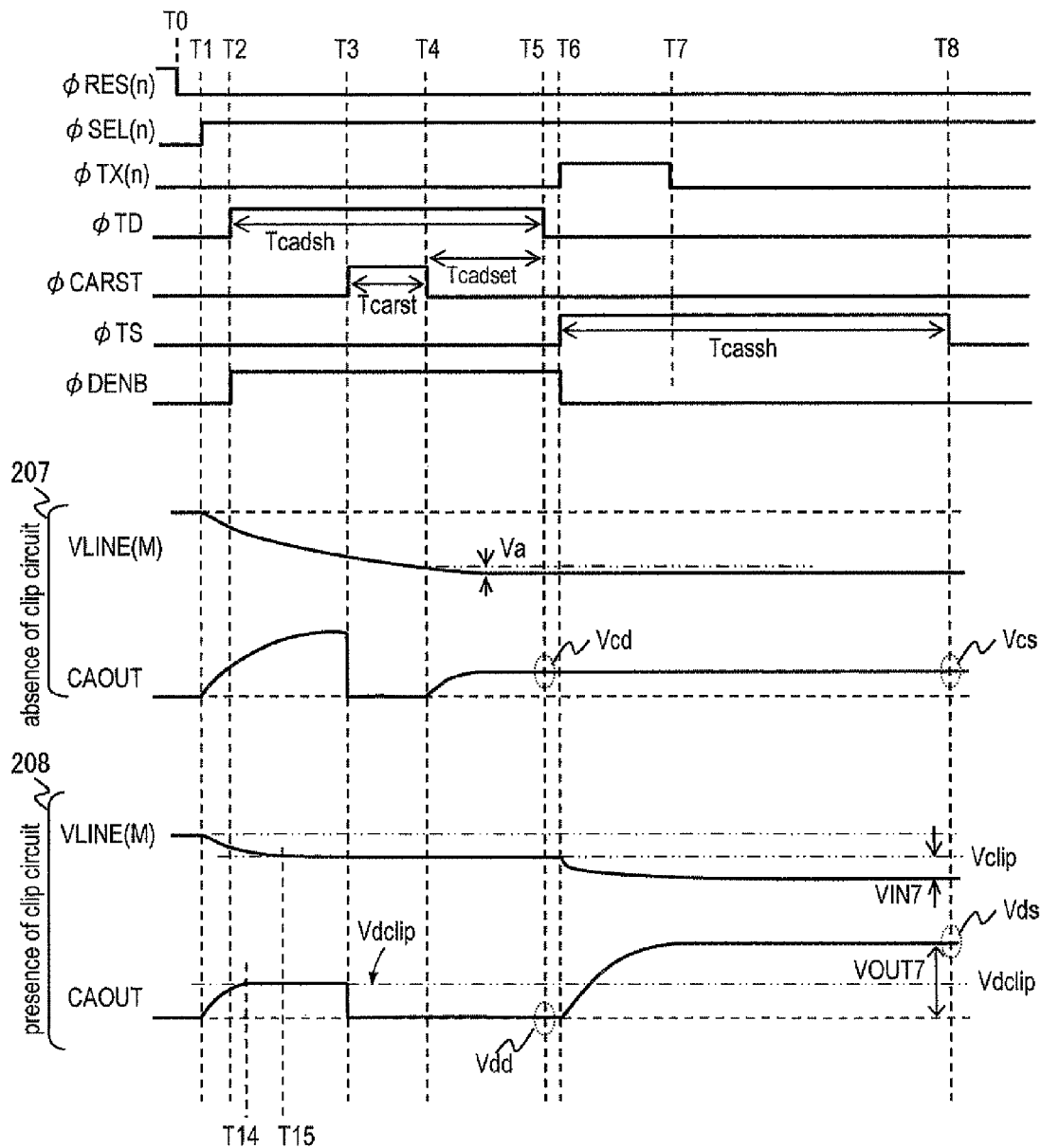
FIG. 15 shows output signal waveforms when light intensity incident in the imaging device 101 is high (the column amplifier CAMP has a fixed gain).

FIG. 15 depicts changes of the signal voltage of the vertical signal line VLINE(M) and changes of the signal voltage of the output CAOUT of the column amplifier CAMP when the column amplifier CAMP has a fixed gain and light intensity to be incident in the imaging device 101 is high. Incidentally, in FIG. 15, the timing signals φRES(n), φTX(n), φSEL(n), φCARST(n), φTD, φTS, φDENB described with FIG. 4, FIG. 12, and FIG. 13 are the same. Further, timings T0 to T8 shown in FIG. 15 denote the same timing positions as the timings T0 to T8 described in FIG. 4, FIG. 12, and FIG. 13. Moreover, signal waveforms during the normal operation when the charge of the photodiode PD does not overflow into the FD part are the same as those during the normal operation 201 shown in FIG. 4.

In FIG. 15, when the overflow of charge occurs but as is conventional the first clip circuit CLP1(M) or the second clip circuit CLP2(M) does not operate, changes of the signal voltage of the vertical signal line VLINE(M) and changes of the signal voltage of the output CAOUT of the column amplifier CAMP are as shown by absence of clip circuit 207. The signal voltage of the vertical signal line VLINE(M) in the absence of clip circuit 207 increases gradually toward the timing T6 to read the optical signal since the charge of the photodiode PD overflows into the FD part by an intense incident light, but almost saturates in mid course from the timing T4 after the column reset is finished to the timing T5 of reading the dark signal. On the other hand, the signal voltage of the output CAOUT of the column amplifier CAMP begins to increase rapidly from the timing T1 when it is output from the vertical signal line VLINE(M). The column amplifier CAMP is once reset in the column reset period from the timing T3 to the timing T4 and the output CAOUT becomes zero, but it increases again in a reading period of a dark signal from the timing T4 to the timing T5. The output CAOUT at the timing T5 when the dark signal is latched in the capacitor Ctd becomes an output voltage Vcd by a voltage change amount Va of VLINE(M), and this voltage Vcd is latched in the capacitor Ctd. Thereafter, the output voltage of the optical signal barely changes from the dark signal voltage Vad in a reading period of the optical signal from the timing T6 to the timing T8 since the voltage of the VLINE(M) is in a saturated state, and at the timing T8 when the optical signal is latched in the capacitor Cts, the output CAOUT becomes an optical signal voltage Vcs which is substantially the same as the dark signal voltage Vad. As a result, the potential difference between the dark signal voltage (Vcd) latched in the capacitor Ctd and the optical signal voltage (Vcs) latched in the capacitor Cts vanishes. Specifically, the potential difference between the dark signal Vdark latched in the capacitor Ctd and the optical signal Vsignal latched in the capacitor Cts in FIG. 3 becomes almost zero, and the image signal output from the imaging device 101 via the horizontal output circuit 103 and the differential amplifier DAMP becomes a black level.

In this aspect, when the first clip circuit CLP1(M) and the second clip circuit CLP2(M) of the imaging device 101 according to this embodiment operate, changes of the signal voltage of the vertical signal line VLINE(M) and changes of the signal voltage of the output CAOUT of the column amplifier CAMP are as shown by presence of clip circuit 208 in FIG. 15. The signal voltage of the vertical signal line VLINE (M) in the presence of clip circuit 208 increases toward the timing T3 when the column reset begins because the charge of the photodiode PD overflows into the FD part due to the intense incident light, and the first clip circuit CLP1(M) operates at a timing T15 in mid course. Then, the first clip circuit CLP1(M) holds it at the clip voltage Vclip until the timing T6 when the operation turns off. On the other hand, the signal voltage of the output CAOUT of the column amplifier CAMP increases rapidly from the timing T1, and the second clip circuit CLP2(M) operates at a timing T14. Then the second clip circuit CLP2(M) holds it at the clip voltage Vdclip until the timing T3 when the column reset is performed. Moreover, from the timing T4 when the column reset is finished to the timing T6, the first clip circuit CLP1(M) holds the signal voltage of the vertical signal line VLINE(M) at the clip voltage Vclip. Thus, the output CAOUT of the column amplifier CAMP holds the voltage which remains unchanged since being column reset, and it is latched in the capacitor Ctd as a dark signal voltage Vdd at the timing T5. Thereafter, operations of the first clip circuit CLP1(M) and the second clip circuit CLP2(M) turn off at the timing T6, the signal voltage of the vertical signal line VLINE(M) begins to increase, and the output CAOUT of the column amplifier CAMP increases accordingly. Then a voltage Vds of the output CAOUT of the column amplifier CAMP at the time timing T8 is latched as the optical signal voltage in the capacitor Cts. As a result, a potential difference VOUT7 is secured between a dark signal voltage (Vdd) latched in the capacitor Ctd and an optical signal voltage (Vds) latched in the capacitor Cts. That is, in FIG. 3, the potential difference VOUT7 between the dark signal Vdark latched in the capacitor Ctd and the optical signal Vsignal latched in the capacitor Cts is obtained, and the image signal output from the imaging device 101 via the horizontal output circuit 103 and the differential amplifier DAMP does not become a black level.

Thus, in the imaging device 101 according to this embodiment, even when a high intensity light is incident, the operation of the first clip circuit CLP1(M) enables to prevent a bright image from being output in a blackish color. Incidentally, when a higher intensity light is incident, the signal voltage of the vertical signal line VLINE(M) changes more rapidly in the absence of clip circuit 207 in FIG. 15. Thus, the saturation occurs earlier than the timing T4, and a voltage change Va after the column reset becomes substantially zero. As a result, the dark signal voltage Vcd and the optical signal voltage Vcs of the output CAOUT of the column amplifier CAMP remain stuck to substantially zero. In such a case, the imaging device 101 according to this embodiment operates similarly to the presence of clip circuit 208 in FIG. 15 with just the operation timings, the timing T14 when the second clip circuit CLP2(M) operates and the timing T15 when the first clip circuit CLP1(M) operates, being earlier in the absence of clip circuit 208 in FIG. 15. As a result, even when a higher intensity light is incident, the imaging device 101 according to this embodiment is able to prevent a bright image from being output in a blackish color by the operation of the first clip circuit CLP1(M).

Figure 16:
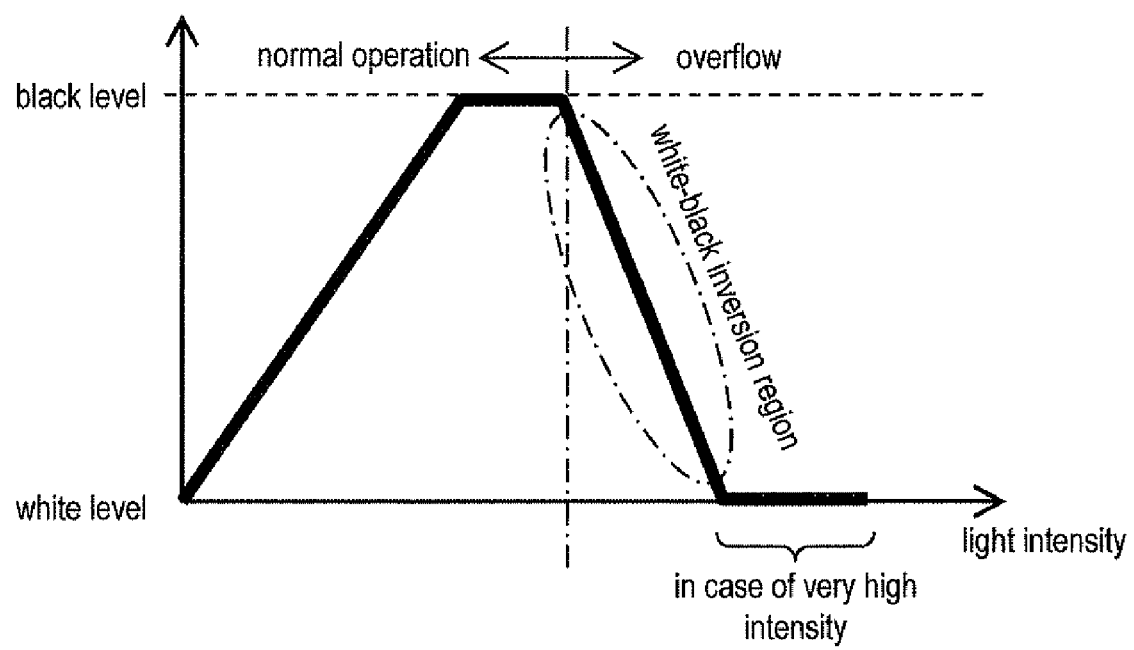
FIG. 16 is an auxiliary diagram showing a relation between light intensity incident in the imaging device 101 and an output.

Here, effects of the imaging device 101 according to this embodiment will be described using FIG. 16. FIG. 16 is a diagram showing a relation between light intensity incident in a conventional imaging device and an output level of an image signal. In FIG. 16, the horizontal axis shows the light intensity which becomes larger toward the right side on the diagram. Further, the vertical axis shows the output level which changes according to the light intensity from a black level to a white level. For example, the imaging device outputs the black level when the intensity of an incident light is zero, which becomes brighter as the light intensity gets higher (stronger) and saturates at the white level as the light intensity further gets higher. So far it is the relation of the light intensity and the output level during the normal operation. When a more intense light is incident and the charge of the photodiode PD overflows into the FD part, there occurs a white-black inversion region where the white level and the black level are inverted, and an actually bright image which has to be imaged in a whitish color is imaged in a grayish color or blackish color. Moreover, when a light with very high intensity is incident, a black image is output if the first clip circuit is not present, but as described with FIG. 15, when the first clip circuit CLP1(M) is present, this can be prevented also in the conventional imaging device. However, when a light with moderately high intensity is incident as described with FIG. 14 (the white-black inversion region in the diagram), the conventional imaging device has the first clip circuit CLP1 (M) only and prevents turning to black insufficiently. On the other hand, since the imaging device 101 of the present invention has the second clip circuit CLP2(M), it can prevent a bright image from being output in a grayish color or blackish color even in the white-black inversion region.

In this manner, with the two clip circuits, the first dip circuit CLP1(M) and the second clip circuit CLP2(M), the imaging device 101 according to this embodiment is able to prevent a bright image from being output in a grayish or blackish color not only when the light with very high intensity of FIG. 16 is incident, but also when a light with moderately high intensity is incident when the gain of the column amplifier is high or in the white-black inversion region, which cause a problem by a charge overflow of the level not reaching the clip level of the first clip circuit CLP1.

As has been described above, when a high luminance subject such as the sun is included in a moving image or a live-view display when mounted in a digital camera, the imaging device 101 according to this embodiment clips a signal out of a predetermined voltage, and thus can achieve a high quality live view and a moving image with high picture quality. Further, since the clip voltage of the vertical signal line VLINE can be generated with reference to the reset voltage Vrst, the influence of dispersion of the reset voltage can be avoided, and a clip voltage is also generated using the compensation circuit (dummy circuit) cancelling a threshold voltage (Vt) of a MOS type transistor for clipping. Thus, a clip voltage to be applied is not affected by dispersion of elements of the clip circuit, and an operation for adjusting to appropriate values in each device can be dispensed with. Furthermore, by making the current source of the clip circuit in common with the current source of the column amplifier, deterioration in the S/N ratio of an image due to ground potential fluctuation in the column amplifier by current fluctuation can be prevented, and current consumption can be reduced.

The many features and advantages of the embodiment are apparent from the detailed specification and, thus, it is intended by the appended claims to cover all such features and advantages of the embodiment that fall within the true spirit and scope thereof. Further, since numerous modifications and changes will readily occur to those skilled in the art, it is not desired to limit the inventive embodiment to the exact construction and operation illustrated and described, and accordingly all suitable modifications and equivalents may be resorted to, falling within the scope thereof.

What is claimed is:

1. An imaging device having:
pixels being disposed two-dimensionally, in matrix, and having a photoelectric conversion part converting a light into an electric signal;
a plurality of vertical signal lines each coupled to a plurality of the pixels in a column direction and receiving an optical signal containing optical information and a reset signal containing a noise component from the pixels;
a column amplifier amplifying the optical signal and the reset signal read to each of the vertical signal lines; and
a holding part holding each of the optical signal and the reset signal amplified in the column amplifier, the imaging device comprising:
a first clip driving circuit being disposed between each of the vertical signal lines and the column amplifier and clips a signal out of a predetermined voltage;
a first clip voltage generation circuit giving a clip voltage to the first clip driving circuit;
a second clip driving circuit being disposed between the column amplifier and the holding part and clips a signal out of a predetermined voltage; and
a second clip voltage generation circuit giving a clip voltage to the second clip driving circuit.

2. The imaging device according to claim 1, wherein:
the first clip voltage generation circuit has a dummy circuit which is of a same size and a same bias as the first clip driving circuit and generates a clip voltage cancelling a gate-source voltage of a MOS transistor for clipping which forms the first clip driving circuit; and
the second clip voltage generation circuit has a dummy circuit which is of a same size and a same bias as the second clip driving circuit and generates a clip voltage cancelling a gate-source voltage of a MOS transistor for clipping which forms the second clip driving circuit.

3. The imaging device according to claim 2, wherein the first clip voltage generation circuit generates the clip voltage based on a level of the reset signal.

4. The imaging device according to claim 1, wherein:
the column amplifier is formed of a differential amplifier having a constant current generator; and
the MOS transistor for clipping which forms the second clip driving circuit has a drain which is coupled to the constant current generator of the differential amplifier.

\* \* \* \* \*